US 9,413,550 B2

(12) United States Patent
Sterenson et al.

(10) Patent No.: US 9,413,550 B2
(45) Date of Patent: Aug. 9, 2016

(54) COLLISION AVOIDANCE MEDIA ACCESS METHOD FOR SHARED NETWORKS

(75) Inventors: Ronald Bruce Sterenson, Ra'anana (IL); Israel Lifshitz, Jerusalem (IL); Zuri Guzikevits, Tel Aviv (IL); Aharona Lurie, Or-Yehuda (IL)

(73) Assignee: SIGMA DESIGNS ISRAEL S.D.I. LTD, Tel Aviv (IL)

( * ) Notice: Subject to any disclaimer, the term of this patent is extended or adjusted under 35 U.S.C. 154(b) by 1138 days.

(21) Appl. No.: 11/218,708

(22) Filed: Sep. 6, 2005

(65) Prior Publication Data

US 2007/0064720 A1  Mar. 22, 2007

(51) Int. Cl.
*H04B 7/212* (2006.01)
*H04L 12/413* (2006.01)

(52) U.S. Cl.
CPC .................................. *H04L 12/413* (2013.01)

(58) Field of Classification Search
CPC  H04W 28/04–28/046; H04W 74/08–74/0858; H04W 72/0446; H04J 3/00; H04J 3/16–3/167; H04J 3/0635–3/076; H04J 3/1682; H04J 3/1694
USPC .................................. 370/458, 447, 461, 462
See application file for complete search history.

(56) References Cited

U.S. PATENT DOCUMENTS

| | | | | |
|---|---|---|---|---|
| 5,371,734 | A * | 12/1994 | Fischer ........................ | 370/311 |
| 6,654,957 | B1 * | 11/2003 | Moore et al. .................. | 725/111 |
| 6,891,810 | B2 * | 5/2005 | Struhsaker et al. ........... | 370/294 |
| 7,050,458 | B1 * | 5/2006 | Lifshitz et al. ................ | 370/468 |
| 2001/0001617 | A1 * | 5/2001 | Koga et al. ..................... | 375/347 |
| 2001/0004599 | A1 * | 6/2001 | Dokko ........................... | 455/452 |
| 2002/0019966 | A1 * | 2/2002 | Yagil et al. .................... | 714/752 |
| 2002/0105970 | A1 * | 8/2002 | Shvodian ...................... | 370/468 |
| 2003/0152059 | A1 * | 8/2003 | Odman ......................... | 370/338 |
| 2003/0198246 | A1 * | 10/2003 | Lifshitz et al. ................ | 370/445 |
| 2004/0076174 | A1 * | 4/2004 | Baum ........................... | 370/458 |
| 2004/0117076 | A1 * | 6/2004 | Horst ............................. | 701/19 |
| 2004/0184426 | A1 * | 9/2004 | Tan ................................ | 370/338 |
| 2005/0025167 | A1 * | 2/2005 | Ishibashi et al. .............. | 370/412 |
| 2005/0159107 | A1 * | 7/2005 | Mauney et al. ............... | 455/41.2 |
| 2005/0243858 | A1 * | 11/2005 | Vitebsky et al. .............. | 370/447 |
| 2005/0265303 | A1 * | 12/2005 | Edwards et al. .............. | 370/349 |
| 2006/0013129 | A1 * | 1/2006 | Sterenson et al. ............ | 370/229 |

(Continued)

FOREIGN PATENT DOCUMENTS

| | | |
|---|---|---|
| EP | 0622713 | 11/1994 |
| WO | WO 00 56928 | 9/2000 |
| WO | WO 03/036837 A1 | 5/2003 |

OTHER PUBLICATIONS

U.S. Appl. No. 11/000,524, Baum et al.

(Continued)

*Primary Examiner* — Andrew Chriss
*Assistant Examiner* — Kenan Cehic
(74) *Attorney, Agent, or Firm* — Eitan, Mehulal & Sadot

(57) ABSTRACT

A method includes scheduling a grid of sub-burst slots in a media access plan, each sub-burst slot having a shorter duration than a minimal transmission burst duration and representing an opportunity for the initiation of a data transmission by a network device. A network device includes a sub-burst slot scheduler and a sub-burst slot grid aligner. The sub-burst slot scheduler publicizes the sub-burst slot media access plan to the network devices. The sub-burst slot grid aligner aligns the sub-burst slot grid in the event of a transmission.

28 Claims, 21 Drawing Sheets

(56) References Cited

U.S. PATENT DOCUMENTS

| | | | |
|---|---|---|---|
| 2006/0227801 A1* | 10/2006 | Nanda | H04L 12/5695 370/447 |
| 2007/0165666 A1* | 7/2007 | Lifshitz et al. | 370/445 |
| 2007/0217449 A1* | 9/2007 | Guzikevits | 370/468 |
| 2008/0008202 A1* | 1/2008 | Terrell et al. | 370/401 |
| 2008/0069151 A1* | 3/2008 | Satoh et al. | 370/503 |
| 2009/0252145 A1* | 10/2009 | Meylan et al. | 370/348 |
| 2010/0002600 A1* | 1/2010 | Jiang et al. | 370/252 |

OTHER PUBLICATIONS

"Home Phoneline Networking Alliance Market Requirements Document for HomaPNA 3.0 Specification", Home Phoneline Networking Alliance, Inc. Oct. 16, 2001.

* cited by examiner

| # | DEVICE ID | GROUP TYPE | FLOW ID | LENGTH | TXOP |
|---|---|---|---|---|---|
| 0 | 0 | 4 }j | 63 | $L_0$ | T0 |
| 1 | 1 | 5 }k | 1 | 0 | T1 |
| 2 | 2 | 5 | 1 | 0 | |
| 3 | 1 | 6 | 2 | 0 | |
| 4 | 2 | 6 }l | 3 | 0 | |
| 5 | 3 | 6 | 3 | 0 | |
| 6 | 4 | 6 | 5 | $L_1$ | |

FIG. 7

| GROUP TYPE (354) | TX POLICY (372) | GROUP SCHEME (374) | DESCRIPTION (376) |
|---|---|---|---|
| 0 | STATE | PRIORITY | CD METHOD WITH PRIORITY SCHEME |
| 1 | | | ∘ |
| 2 | | | ∘ |
| 3 | | | ∘ |
| 4 | EDGE | FIXED | SB SLOT METHOD WITH FIXED SCHEME |
| 5 | EDGE | ROTATED | SB SLOT METHOD WITH ROUND-ROBIN SCHEME |
| 6 | EDGE | REPEATED | SB SLOT METHOD WITH ROUND-ROBIN SCHEME |
| 7 | | | ∘∘∘ |

| # | DEVICE ID | GROUP TYPE | FLOW ID | LENGTH | TXOP |
|---|---|---|---|---|---|
| 1 | 1 | 5 | 0 | 0 | T0 |
| 2 | 1 | 5 | 1 | 0 | |
| 3 | 2 | 5 | 1 | 0 | |
| 4 | 2 | 5 | 2 | 0 | |
| 5 | 63 | 5 | 63 | D0 | |
| 6 | 1 | 6 | 0 | 0 | |
| 7 | 1 | 6 | 1 | 0 | |
| 8 | 2 | 6 | 1 | 0 | |
| 9 | 2 | 6 | 2 | 0 | |
| 10 | 1 | 6 | 0 | 0 | |
| 11 | 63 | 6 | 63 | D1 | |
| 12 | 1 | 5 | 0 | 0 | T1 |
| 13 | 1 | 5 | 1 | 0 | |
| 14 | 2 | 5 | 1 | 0 | |
| 15 | 2 | 5 | 2 | 0 | |
| 16 | 1 | 5 | 0 | 0 | |
| 17 | 1 | 5 | 1 | 0 | |
| 18 | 63 | 5 | 63 | D2 | |
| 19 | 1 | 6 | 0 | 0 | |
| 20 | 1 | 6 | 1 | 0 | |
| 21 | 2 | 6 | 1 | 0 | |
| 22 | 2 | 6 | 2 | 0 | |
| 23 | 1 | 6 | 0 | 0 | |
| 24 | 63 | 6 | 63 | D3 | |

FIG. 9

COLLISION AVOIDANCE MEDIA ACCESS METHOD FOR SHARED NETWORKS

FIELD OF THE INVENTION

The present invention relates to data networks generally and to media access allocation in data networks in particular.

BACKGROUND OF THE INVENTION

There are many different types of data networks, of which Ethernet is perhaps the best known. Some data networks have resource reservation schemes. One such network is Home-PNA (Home Phoneline Network Alliance) v3.0, which is designed to work over existing telephone lines to create a home/small office network. U.S. Pat. No. 7,408,949, issued Aug. 5, 2008 and assigned to the common assignee of the present invention, describes generally how to extend the HomePNA v3.0 standard to operate over such a hybrid network of telephone and coax lines.

HPNA v.3 and other such resource reservation networks have a scheduler, described hereinbelow, to guarantee media resources to network devices, to prevent collision between multiple network devices using the same line and to ensure quality of service. In coax networks, preventive collision detection limits the dynamic range of the network devices, which may impose physical limitations on the size of the network, so it is preferable to use collision avoidance methods for media access in coax networks.

Reference is now made to FIG. 1, which depicts a prior art data network 10, comprising at least two network devices 12 and 14, connected to computers. Network device 12 comprises a modem 16 which includes, among other items, a carrier sensor 20 and a transceiver 24. Network device 14 comprises a modem 18 which includes, among other items, a carrier sensor 20, a scheduler 22 and a transceiver 24. Scheduler 22 creates and sends to each device on network 10 a media access plan (MAP) at the beginning of each transmission cycle. Transceiver 24 either transmits, or both transmits and receives data transmissions over network 10.

An exemplary timing diagram 40 for an exemplary transmission cycle of network 10 (FIG. 1) is shown in FIG. 2, reference to which is now made. Timing diagram 40 shows a detailed schedule of future transmission opportunities (TXOPs) that are made available to specific network devices in the upcoming transmission cycle at specific and non-overlapping times. The start time and length of each scheduled TXOP in the upcoming transmission cycle, such as TXOPs 44, 48 and 50 shown in FIG. 2, as well as the network device to which each TXOP is assigned, is scheduled by scheduler 22 (FIG. 1) in the MAP for the upcoming transmission cycle. The transmission cycle is then initiated, as shown in FIG. 2, with the publication of the MAP by scheduler 22 to the network devices on network 10 (FIG. 1) during MAP publication transmission 30. For example, as shown in timing diagram 40 of FIG. 2, TXOP 44 is shown to be the first TXOP and may be assigned to device 1, TXOP 48 is shown to be the second TXOP and may be assigned to device 2, and TXOP 50 is shown to be the third TXOP and may be assigned to device 3. As shown in timing diagram 40, the MAP for the represented transmission cycle, also includes a scheduled registration TXOP 54 during which new devices may ask to join network 10.

After publication of the MAP during MAP publication transmission 30, device transmissions may begin. Each device recognizes a particular TXOP that has been assigned to it according to the MAP, and either utilizes the TXOP or passes on it.

In timing diagram 40 shown in FIG. 2, it may be seen that device 1 utilizes TXOP 44, as illustrated by hatched area 56 indicating transmission activity of device 1 during TXOP 44. However, if, as shown, devices 2 and 3 do not use TXOPs 48 and 50, these assigned portions of bandwidth are wasted. Furthermore, if no new devices use registration TXOP 54 for registering, the bandwidth of TXOP 54 is also wasted.

As can be seen, the prior art MAP wastes significant resources when scheduled TXOPs for transmission and registration are not fully utilized. Due to the predetermined sizes of the TXOPs, which, at a minimum, are required to be sufficiently large to accommodate at least one data frame, the method suffers from inefficient bandwidth utilization and high per device overhead. Predetermined TXOP size per cycle also means that adaptation of bandwidth change is slow and complex. Small TXOPs relative to transmission burst size may cause Head-Of-Line (HOL) Blocking. Scalability suffers as the network capacity drops with increasing network size. For bi-directional protocols such as TCP and TFTP only low data rates may be achieved due to long round-trip time (RTT).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 7 is an illustration of a tabular representation of an exemplary SBSMAP constructed and operative in accordance with a preferred embodiment of the present invention;

FIG. 8 is an illustration of an exemplary Group_Type table in which parameters used to define the SBSMAP of FIG. 7 are catalogued;

FIG. 9 is an illustration of a tabular representation of an exemplary alternative SBSMAP having explicit group separators;

Figure 1:
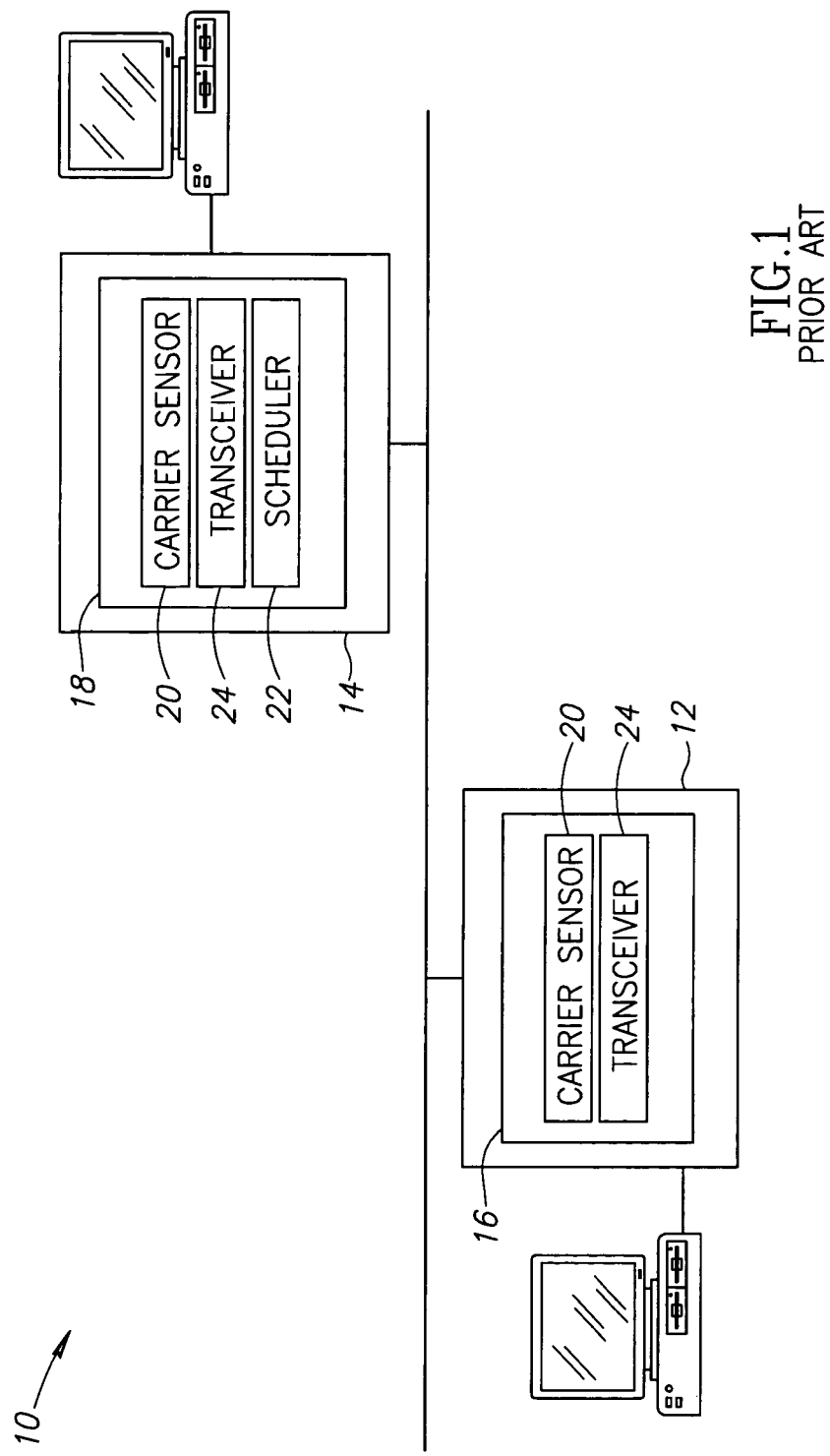
FIG. 1 is a schematic illustration of a prior art data network.
Figure 2:
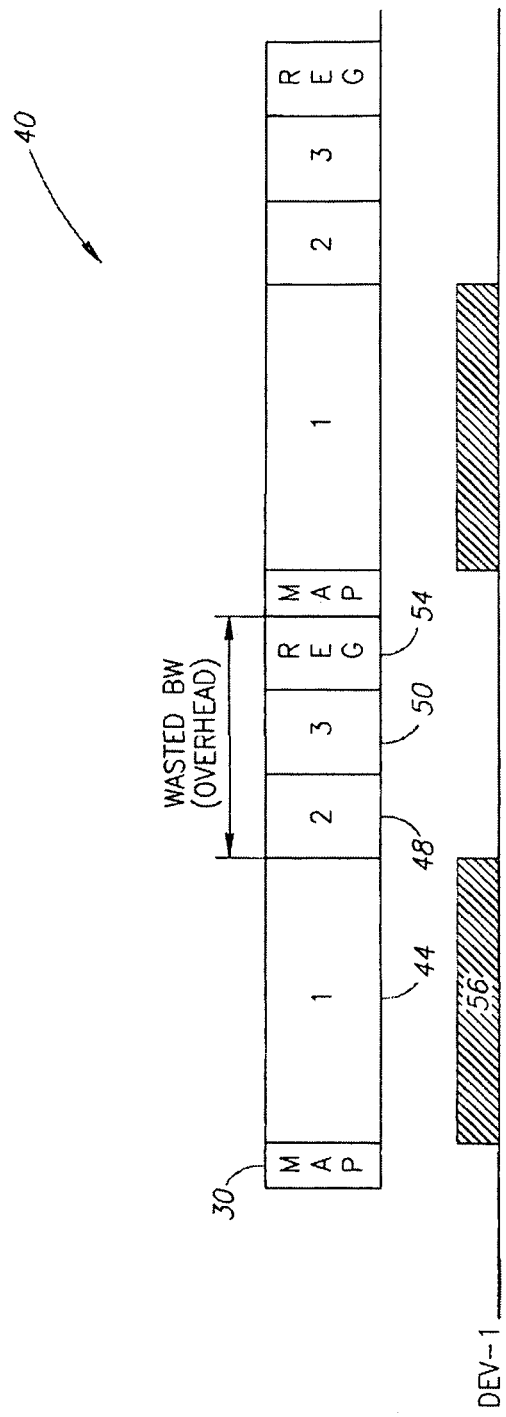
FIG. 2 is a timing diagram illustration for an exemplary transmission cycle of the network shown in FIG. 1.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

The present invention may extend media access methods using carrier-sensing and collision avoidance techniques to allow multiple network devices to perform collision-free burst-like media access within shared transmission opportunities (TXOPs). For example, the present invention may be used to extend the media access method of HomePNA (Home Phone Network Alliance) v3.0. It will be appreciated that for HomePNA and other media access methods in which collision detection is feasible, it may be preferable to use collision avoidance due to other benefits which it entails.

In order to extend media access methods using carrier-sensing and collision avoidance techniques to allow multiple network devices to perform collision-free burst-like media access within shared TXOPs, the present invention may replace fixed-size, non-overlapping TXOPs with a grid of appreciably smaller time slots, which may each represent an opportunity for the initiation of a data transmission by a network device. The appreciably smaller time slots may be sub-burst slots, i.e., the time allotted to each slot may be shorter than a minimal transmission burst duration. It will be appreciated that the principal advantage provided by minimally sized time slots such as sub-burst slots may be that when a network device does not use its assigned time slot transmission opportunity, minimal time may be wasted before the opportunity to transmit is passed to the next device in the queue.

Figure 3:
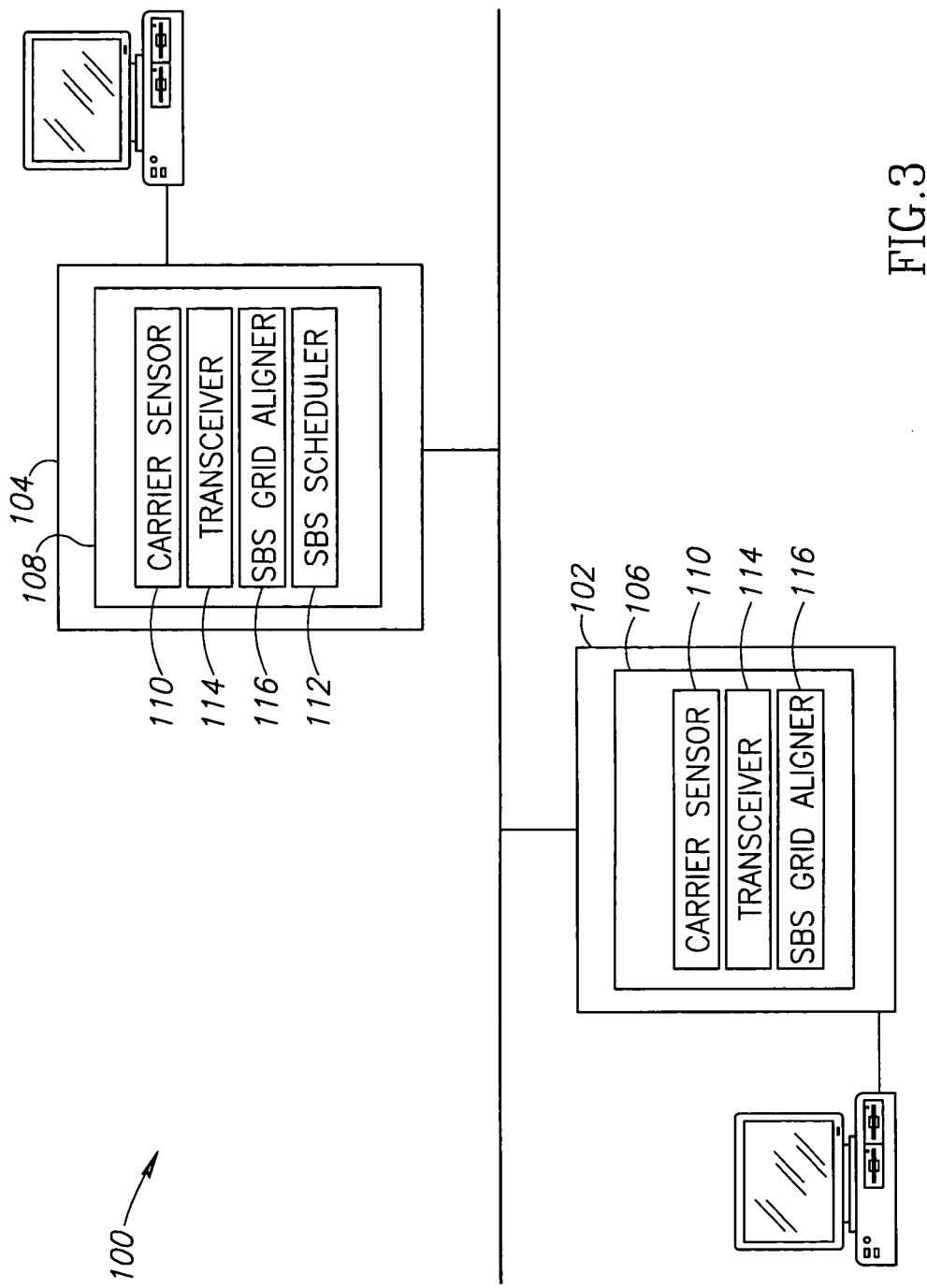
FIG. 3 is a schematic illustration of a data network, constructed and operative in accordance with a preferred embodiment of the present invention.

Reference is now made to FIG. 3, which depicts a collision avoiding data network 100 constructed and operative in accordance with the present invention. Data network 100 may comprise at least two network devices 102 and 104, connected to computers. Network device 102 may comprise a modem 106 which may include, among other items, a carrier sensor 110, which may be similar to prior art carrier sensors, a transceiver 114, which may be similar to prior art transceivers, and a sub-burst slot (SBS) grid aligner 116. Network device 104 may comprise a modem 108 which may include, among other items, a carrier sensor 110, a transceiver 114, a SBS grid aligner 116 and a sub-burst slot scheduler 112. Sub-burst slot scheduler 112 may create and send to each device on network 100 a media access plan having sub-burst slots (SBSMAP) at the beginning of each transmission cycle. SBS grid aligner 116 may realign the sub-burst slot grid according to the SBSMAP advertised by scheduler 112, in accordance with the occurrence of transmissions.

It will appreciated that the configuration shown in FIG. 3 for network 100 is exemplary, and that devices 102 and 104 which are illustrated in FIG. 3 as stand-alone devices, may operate as stand-alone devices or as integrated components in other devices. For example, in alternative configurations of network 100 constructed and operative in accordance with a preferred embodiment of the present invention, either or both of devices 102 and 104 may be integrated into a personal computer, a set-top box, a television, a PVR or other device.

Like the prior art MAP, the SBSMAP provided by the present invention may describe a schedule of transmission opportunities (TXOPs) to each device on network 100. However, unlike the prior art MAP, the SBSMAP provided by the present invention may not exclusively reserve super-burst sized portions of the TXOP for particular network devices or data flows. Rather, each scheduled sub-burst slot may constitute an opportunity of brief duration for the device or data flow with which it is associated to begin transmitting. Each sub-burst slot may be much shorter in length than the predetermined, super-burst sized TXOPs of the prior art MAP.

It will be appreciated that the method for media access provided by the present invention may waste less bandwidth than the prior art due to the brief duration of the sub-burst slots provided by the present invention, which if not used for initiating a transmission, may comprise a much smaller amount of wasted bandwidth than unused prior art TXOPs.

Figure 4:
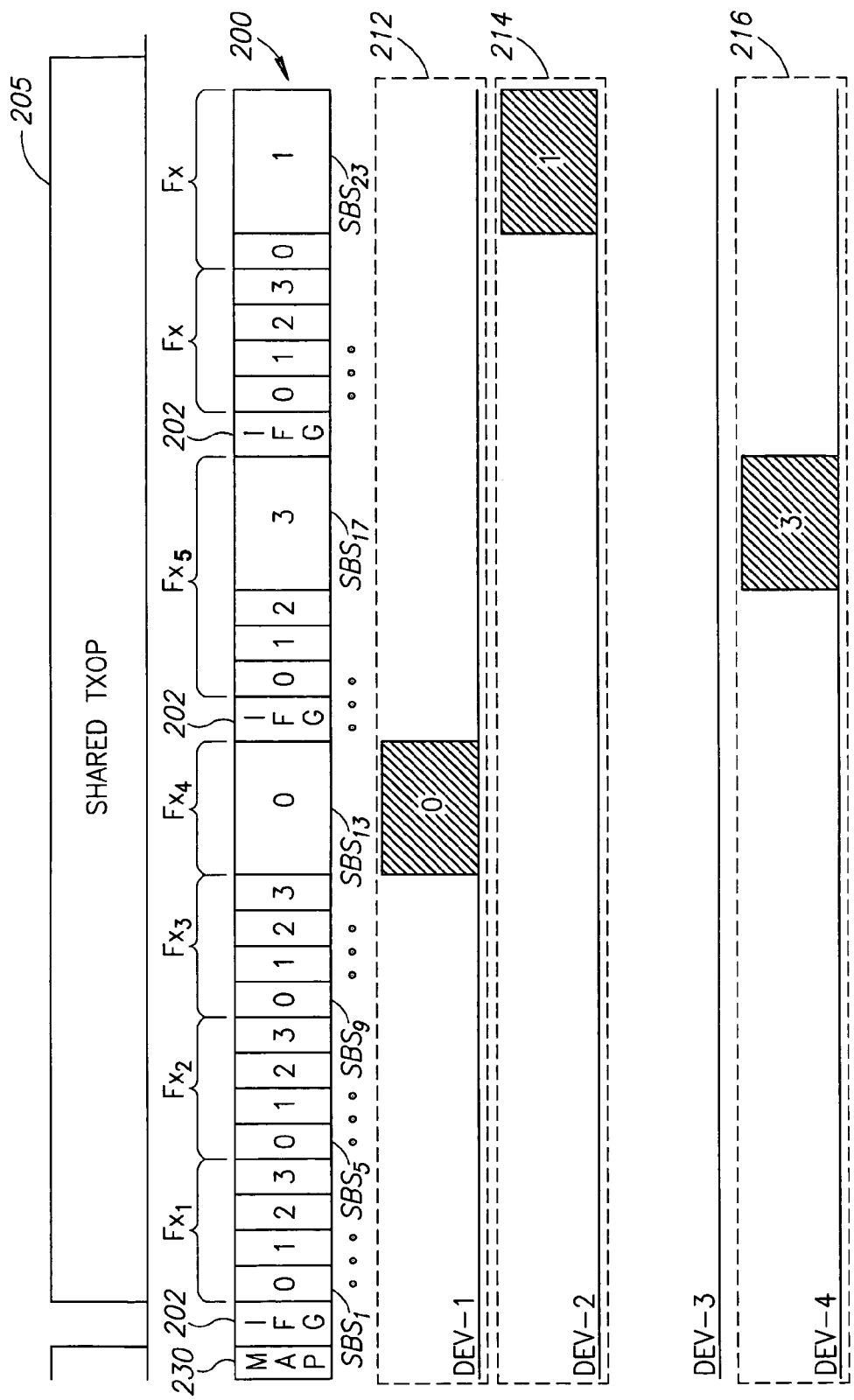
FIG. 4 is a timing diagram illustration for an exemplary transmission cycle for an exemplary sub-burst slot media access plan (SBSMAP) constructed in accordance with a preferred embodiment of the present invention and operative in the network shown in FIG. 3.

Reference is now made to FIG. 4 which shows an exemplary timing diagram 200 for an exemplary transmission cycle of network 100 (FIG. 3). As shown in FIG. 4, the transmission cycle is initiated with the publication of the SBSMAP by SBS scheduler 112 to the network devices on network 100 (FIG. 3) during SBSMAP publication transmission 230. As shown in FIG. 4, a multiplicity of sub-burst slots $SBS_n$ are scheduled in shared TXOP 205 in accordance with the SBSMAP. In accordance with a preferred embodiment of the present invention, each sub-burst slot $SBS_n$ may represent an opportunity for the network device or data flow associated with that sub-burst slot to initiate a transmission. Collectively, the sub-burst slots scheduled in accordance with the SBSMAP may form a grid of transmission opportunity start times. In the example shown in FIG. 4, sub-burst slots $SBS_1$-$SBS_{23}$ form a grid of transmission opportunity start times, initialized at the beginning of shared TXOP 205.

In accordance with a preferred embodiment of the present invention, each sub-burst slot $SBS_n$ in the grid may serve as a placeholder, reserving the opportunity for its associated network device or data flow to transmit at the time which the sub-burst slot occupies in the sequence of sub-burst slots in the grid. For example, as shown in FIG. 4, the first opportunity to transmit is reserved for the network device or data flow associated with $SBS_1$. The network device or data flow associated with $SBS_1$ may act on this opportunity to transmit, or pass on it.

In order for a network device to act on an opportunity to transmit, it must initiate its transmission at the beginning of its associated sub-burst slot. The duration of sub-burst slots in accordance with a preferred embodiment of the present invention may be 8-32 μsec and the window for acting upon the opportunity to initiate a transmission may be the first 2-4 μsecs of the sub-burst slot. It will be appreciated that the duration of each sub-burst slot in accordance with a preferred embodiment of the present invention may be a variable parameter, which may be varied in a fixed scheme or a dynamic scheme. For example, sub-burst slot duration may be varied according to the characteristics of the devices which may participate in the network.

In the event that the transmission opportunity provided by a sub-burst slot $SBS_n$ is not utilized by the network device or data flow associated with it, the network device or data flow associated with the next sub-burst slot $SBS_{(n+1)}$ in the grid sequence may then be given the opportunity to transmit.

Returning now to FIG. 4, it may be seen in the illustrated example that no transmissions occur during shared TXOP 205 until the fourth transmission opportunity allotted to network device DEV-1, which is associated with the sub-burst slot numbered "0" in the figure. As shown in transmission activity diagram 212 for network device DEV-1, network device DEV-1 passes on the transmission opportunities presented by the sub-burst slots $SBS_1$, $SBS_5$ and $SBS_9$ numbered "0", and transmits for the first time during sub-burst slot $SBS_{13}$. During $SBS_{13}$ network device DEV-1 begins transmitting, and occupies the transmission medium until its transmission is complete. It will be appreciated, therefore, as illustrated in FIG. 4, that when utilized for a transmission, the sub-burst slots provided by the present invention may be expandable, expanding to allow the completion of the transmission begun by the network device during the sub-burst slot. The lengths to which the sub-burst slots may expand may be unlimited, or they may be limited. The end of a shared TXOP may constitute a limit to the expansion of a sub-burst slot during a transmission. Alternatively, a transmission may extend the length of a shared TXOP.

As described hereinabove, at the beginning of each cycle, the network devices on network 100 may receive a schedule of transmission opportunities, i.e. an SBSMAP detailing a lineup of sub-burst slots. Transmissions may then occur, such as the exemplary transmissions shown in FIG. 4 during sub-burst slots $SBS_{13}$, $SBS_{17}$ and $SBS_{23}$. The end of a transmission may be identified by an Inter Frame Gap (IFG) 202, such as those shown in FIG. 4 succeeding the transmissions during sub-burst slots $SBS_{13}$ and $SBS_{17}$.

When transmissions occur, SBS grid aligner 116 (FIG. 3) in each network device on network 100 may recalculate the timing of the sub-burst slot grid so that each network device may know at what time its next transmission opportunity is scheduled. While the order of the sub-burst slots in the grid is known because that information is provided to each network device in the advertised SBSMAP, the timing of the grid is changed due to, and in direct accordance with, the duration of the transmissions which occur.

It may further be seen in FIG. 4 that while the sub-burst slots numbered "0" are associated with network device DEV-1, the sub-burst slots numbered "1" are associated with network device DEV-2, and the sub-burst slots numbered "3" are associated with the network device DEV-4. This may be seen in the transmission activity diagrams 214 and 216, which show transmission activity for network devices DEV-2 and DEV-4 respectively. It is shown that after passing on its first 5 transmission opportunities provided by sub-burst slots $SBS_2$, $SBS_6$, $SBS_{10}$, $SBS_{15}$ and $SBS_{19}$ numbered "1", network device DEV-2 transmits during $SBS_{23}$. It is also shown that network device DEV-4 passes on its first three transmission opportunities ($SBS_4$, $SBS_8$ and $SBS_{12}$) and then transmits during $SBS_{17}$.

In the example shown in FIG. 4 each network device numbered N is associated with the sub-burst slots numbered N-1. It may therefore also be understood from FIG. 4 that the sub-burst slots numbered "2" are associated with network device DEV-3 which does not transmit at all during TXOP 205. However, it will be appreciated that in accordance with a preferred embodiment of the present invention, a particular sub-burst slot may be associated with any network device or data flow, and that the identity of the network device or data flow associated with a particular sub-burst slot may be encoded in the SBSMAP, as will be explained later in further detail with respect to FIG. 7.

In accordance with an additional preferred embodiment of the present invention, sub-burst slots may be organized in modular groups, and these modular group units may be assembled into group sequences of one or more groups and scheduled in the SBSMAP. A group may consist of a particular sequence of sub-burst slots, each of which is associated with a particular network device or data flow. Each group may also be associated with a particular one of a plurality of group types. In accordance with a preferred embodiment of the present invention, group types may dictate scheduling protocol in various instances. For example, in the event of the interruption of a group sequence by a transmission, SBS scheduler 112 (FIG. 3) may determine which sub-burst slot may be scheduled after the transmission in accordance with the group type of the interrupted group. Scheduling schemes for the repetition, rotation or omission of a group or sequence of groups in a TXOP may also be dictated by group type.

Group affiliation, i.e., which sub-burst slots comprise a group of which type, in addition to network device and data flow association, may also be encoded in the SBSMAP, in accordance with a preferred embodiment of the present invention, as will be discussed later in further detail with respect to FIG. 7.

In the example shown in FIG. 4, TXOP 205 is scheduled with successive repetitions of group Fx, a fixed type group comprising the sequence of sub-burst slots "0,1,2,3", where each sub-burst slot is associated with a network device according to the formula N+1, where N is the number of the sub-burst slot. As shown in FIG. 4, the scheduling scheme dictated by a fixed group, in accordance with a preferred embodiment of the present invention, is that a transmission constitutes an interruption of the continuity of the current group sequence, and that after the transmission, the scheduled lineup begins with the first sub-burst slot in the group. This may be seen in FIG. 4 when the transmission during $SBS_{13}$ interrupts the fourth repetition of group Fx, $Fx_4$, and the fifth repetition of group Fx, Fx$_5$, beginning with sub-burst slot "0", is scheduled after the transmission.

Figure 5:
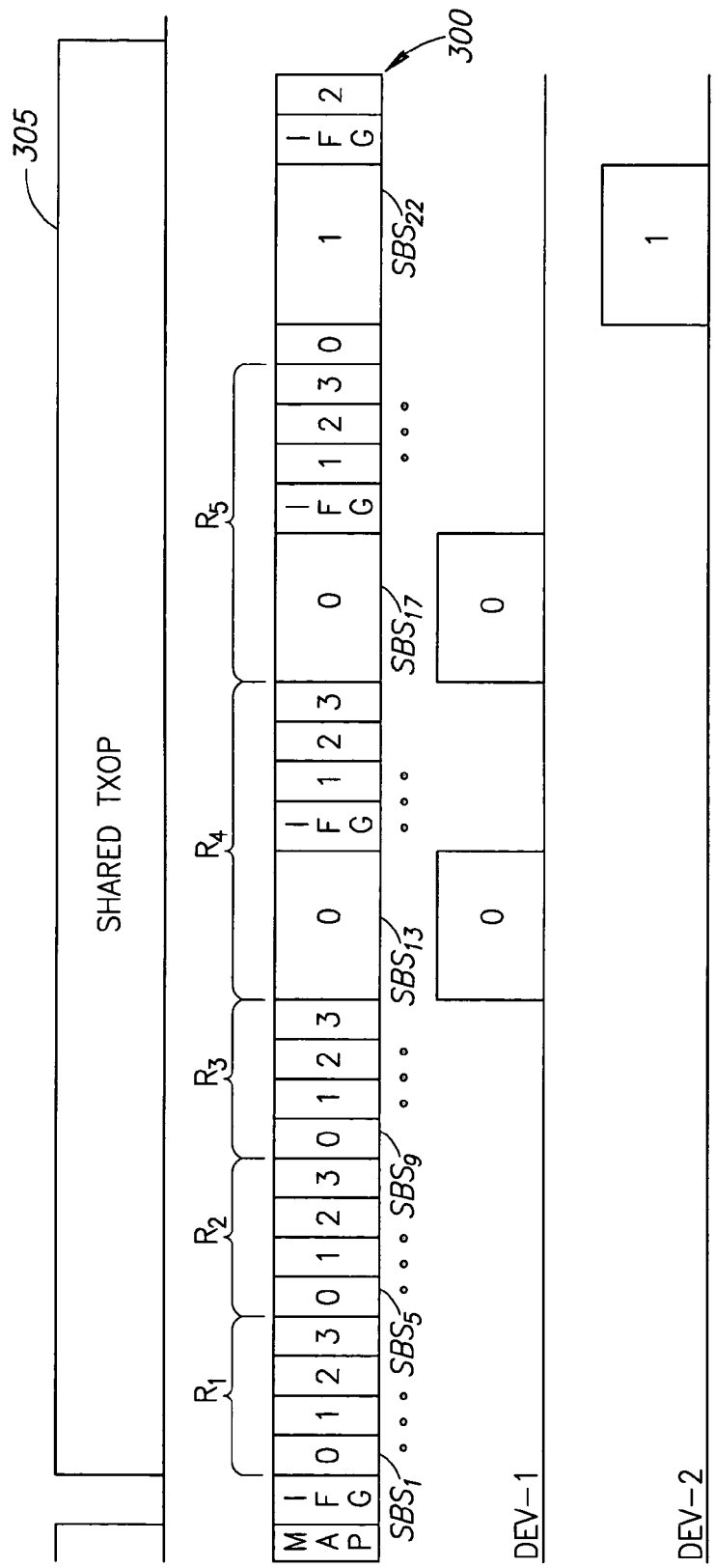
FIG. 5 is a timing diagram illustration for an exemplary transmission cycle for an exemplary alternative SBSMAP featuring an alternative group scheduling scheme.

An alternative scheduling scheme, as dictated by a different group type, is shown in FIG. 5, reference to which is now made. FIG. 5 shows timing diagram 300 for an exemplary SBSMAP constructed and operative in accordance with a preferred embodiment of the present invention, similar to timing diagram 200 shown in FIG. 4. Similar elements in FIGS. 4 and 5 are referred to by corresponding reference numerals.

In FIG. 5, the basic modular group unit R, of which successive repetitions are scheduled in shared TXOP 305, comprises a sequence of sub-burst slots "0,1,2,3", which is identical to the sequence of sub-burst slots of group Fx in FIG. 4. However, because they are associated with different group types, group Fx and group R dictate different scheduling schemes in shared TXOPs 205 and 305 respectively.

In the example shown in FIG. 5, three scheduled rounds of group R, R$_1$, R$_2$ and R$_3$ pass with no transmissions occurring. During sub-burst slot SBS$_{13}$ numbered "0" in group R$_4$, network device DEV-1 transmits. As shown in FIG. 5, the scheduling protocol associated with group R dictates that after a transmission, the group sequence continues uninterrupted. Thus, the next sub-burst slot scheduled, SBS$_{14}$ is shown to be numbered "1". It may further be seen in FIG. 5 that the remainder of group R4, and similarly, group R5, are scheduled fully without regard for 'interruptions' caused by transmissions.

Figure 6:
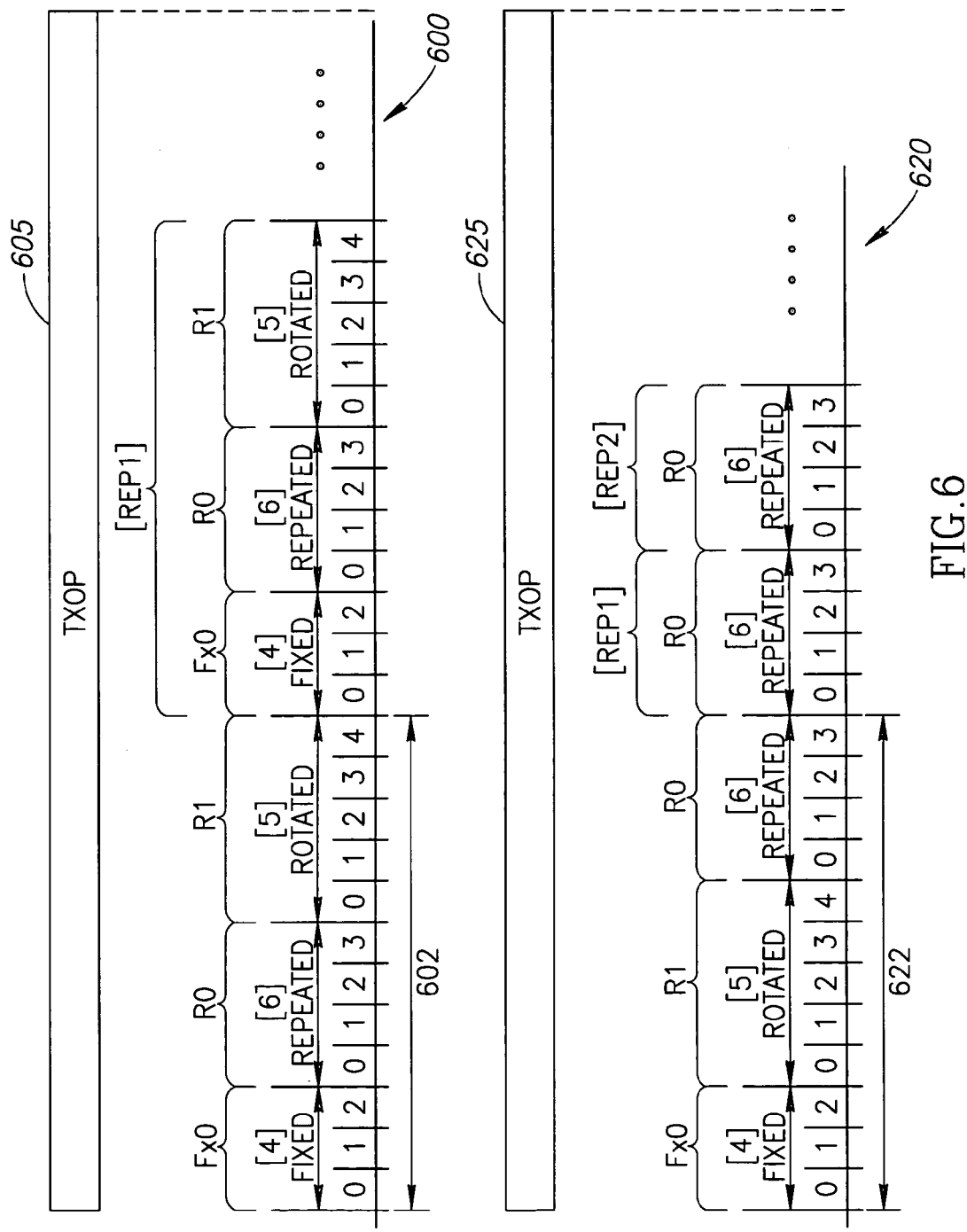
FIG. 6 is a comparative timing diagram illustration of a repeated type group scheduling scheme and a rotated type group scheduling scheme.

Reference is now made to FIG. 6 which illustrates two additional exemplary group types provided in accordance with a preferred embodiment of the present invention, the repeated group type (R0) and the rotated group type (R1). In accordance with a preferred embodiment of the present invention, both the rotated and repeated group types share the post-transmission scheduling characteristics of group R, described hereinabove with respect to FIG. 5. That is, after a transmission, the scheduling of the group sequence continues uninterrupted, unlike in the case of fixed groups, described hereinabove with respect to FIG. 4. However, the rotated and repeated groups dictate different schemes for the continued scheduling of a group or sequence of groups in a TXOP.

FIG. 6 shows two exemplary timing diagrams 600 and 620. It may be seen in timing diagram 600 that the schedule of groups scheduled by an SBSMAP for TXOP 605 comprises the initial modular sequence 602 of the groups "Fx0, R0, R1", where group Fx0 comprises the sequence of sub-burst slots "0,1,2", group R0 comprises the sequence of sub-burst slots "0,1,2,3", and group R1 comprises the sequence of sub-burst slots "0,1,2,3,4". In accordance with a preferred embodiment of the present invention, the type of the last group in initial modular sequence 602 may determine which group or groups may be scheduled for the remainder of the duration of the TXOP. For example, as shown in FIG. 6, the last group in initial modular sequence 602 is R1, a rotated type group. Accordingly, as per the TXOP remainder scheduling scheme associated with the rotated group type, the sequence of groups in initial modular sequence 602, i.e. "Fx0, R0, R1", is rescheduled in REP1 in TXOP 605, as shown in FIG. 6.

In timing diagram 620, the constituent groups of initial modular sequence 622 are the groups "Fx0, R1, R0", such that the only difference between initial modular sequence 602 and initial modular sequence 622 is the alternative positions of groups R1 and R0 in the two sequences. More specifically, the difference between the two sequences is that the last group in initial modular sequence 602 is rotated group R1, and the last group in initial modular sequence 622 is repeated group R0. It is shown in FIG. 6 that the TXOP remainder scheduling scheme which may be associated with the repeated type group is the continued repetition of the last group in the initial modular sequence of the SBSMAP. It is accordingly shown in FIG. 6 that repeated group R0 is repeated in Rep1, Rep2 and for the remainder of TXOP 625.

It will be appreciated that the group type dependent scheduling schemes and protocols provided by the present invention may not be limited to the exemplary scheduling schemes and protocols described hereinabove with respect to FIGS. 4, 5 and 6. For example, an additional post-transmission scheduling protocol which may be incorporated into an SBSMAP provided by the present invention may be an alternative fixed scheme, which may be associated with the alternative fixed group type. The post-transmission scheduling protocol dictated by the alternative fixed group may be similar to the fixed group scheme described with respect to FIG. 4. However, after a transmission, the first sub-burst slot to be scheduled may not be the first-sub-burst slot in the group. The alternative fixed group type may dictate that the assignment of the first sub-burst slot to be scheduled after a transmission may rotate through the group sub-burst slots in a round-robin manner.

Additional TXOP remainder scheduling schemes may include, for example, alternative repeated schemes in which a selection of the groups in the initial modular sequence, rather than just the final group in the sequence may be repeated for the remainder of the TXOP. For example, the group type "repeated_final_2" may dictate the repetition of the last two groups in the initial modular sequence for the remainder of the TXOP. A group type "initial" may dictate that the group or groups associated with the group type "initial" in the initial modular sequence may only be scheduled once in a TXOP, overriding the scheduling instructions of other scheduling schemes pertaining to that group or groups, which might otherwise dictate that it or they be rescheduled.

It will be appreciated that the creation of an SBSMAP using groups as modular building blocks whose constituent participants may be chosen for particular effect, and which may be scheduled in the SBSMAP in schemes designed for particular effect may provide a highly flexible and customizable bandwidth allocation method. A significant measure of control over the allocation of transmission opportunities to particular network devices and data flows may thus be provided by the present invention.

Reference is now made to FIG. 7 which shows how the scheduling schemes and protocols described hereinabove may be encoded into an SBSMAP constructed and operative in accordance with a preferred embodiment of the present invention and represented in tabular form. As shown in table 363 in FIG. 7, the parameters which may be used to define an SBSMAP in accordance with a preferred embodiment of the present invention may be Row_Number 350, Device_ID 352, Group_Type 354, Flow_ID 356, Length 358 and TXOP_Number 360. Row_Number 350 may be a sequential serial number assigned to each row in the SBSMAP table. Device_ID 352 may be an identification number corresponding to a particular network device. Group_Type 354 may be an identification number associated with a particular group type. Flow_ID 356 may be an identification number associated with a data flow. Length 358 may be the duration allocated to a TXOP, and TXOP_Number 360 may be a sequential serial number assigned to each sequential TXOP.

In table 363, which is an example of an implicit SBSMAP table, each row 365 in the table may correspond to a sub-burst slot in the SBSMAP. This may not be the case in an explicit SBSMAP table which will be explained later with respect to FIG. 9.

In accordance with a preferred embodiment of the present invention, the association of a sub-burst slot with a particular network device and data flow as well as its group affiliation may be encoded in the SBSMAP table, as shown in FIG. 7. The association of a sub-burst slot with a particular network participant may be defined by the parameters Device_ID 352 and Flow_ID 356. A sub-burst slot may thereby be associated with a particular network device, a particular group of network devices, a particular data flow or group of data flows, or a particular data flow or group of data flows restricted to a particular network device or group of network devices.

In accordance with a preferred embodiment of the present invention, certain values of Device_ID 352 and Flow_ID 356 may be reserved for internal network control and assignment definition. For example, a Device_ID value of 0 may be reserved for the group of all the network devices, including unregistered devices, while Device_ID values of 1-62 may be reserved for particular network devices or groups of devices. For any Device_ID 1-62, a Flow_ID of 0 may be reserved for network control flows while the Flow_ID values 1-63 may be reserved for particular flows. The Device_ID value of 63 may be reserved for assignment definition. In conjunction with a Device_ID of 63, particular Flow_ID values may be reserved to trigger particular scheduling schemes, as will be discussed later in further detail with respect to FIGS. 14-17B.

Group affiliation, i.e., which sub-burst slots comprise a group of which type may be encoded in the SBSMAP via particular value assignments in Group_Type parameter 354. Each group type may be associated with a particular Group_Type value. For example, the Group_Type value "4" may be associated with the group type "fixed", the Group_Type value "5" may be associated with the group type "rotated" and the Group_Type value "6" may be associated with the group type "repeated".

In the example shown in FIG. 7, it is shown that the SBSMAP defined by table 363 has two TXOPs T0 and T1. The first TXOP T0 has a duration of $L_0$, in which one group, group j, which is a fixed type group, is scheduled. It may also be seen that group j comprises one sub-burst slot, and since this sub-burst slot is the sole sub-burst slot in TXOP T0, its duration is also $L_0$.

The second TXOP in the SBSMAP defined by table 363 is T1, having a length $L_1$. In accordance with a preferred embodiment of the present invention, initial modular sequence 369 is scheduled for the duration $L_1$ in accordance with the scheduling schemes dictated by the SBSMAP parameters. It is shown in FIG. 7 that initial modular sequence 369 comprises group k, a rotated type group having two sub-burst slots, followed by group l, a repeated type group having four sub-burst slots. It may therefore be understood that after the first scheduling of initial modular sequence 369 in TXOP T1, group l will repeat for the duration of the TXOP length $L_1$.

The SBSMAP provided by the present invention may also include a registration sub-burst slot during which new devices may request to be added to network 100. In the example shown in FIG. 7 it may be seen that the sub-burst slot in group j is a registration sub-burst slot, since its Device_ID is 0 and its Flow_ID is 63. In the example shown in FIG. 7 the exemplary Device_ID value of "0" indicates "all devices", including unregistered ones, and the exemplary Flow_ID value of 63 indicates a registration sub-burst slot.

As provided by the present invention, access to registration sub-burst slots may be contention-based, and collisions may occur. A higher level protocol may handle retries.

It will be appreciated that network bandwidth overhead may be appreciably reduced by the replacement of a long registration TXOP with a shorter registration time-slot, such as a sub-burst slot, which may monopolize a minimum of bandwidth in the event that it is not used.

FIG. 8, reference to which is now made, shows an exemplary Group_Type table 370 in which the group types provided by the present invention may be catalogued. In Group_Type table 370 additional descriptive parameters are listed alongside Group_Type values 354. The parameters provided in table 370 for each Group_Type value, as shown in table 370, are TX_Policy 372, Group_Scheme 374 and Description 376.

It may be seen in FIG. 8 that the TX policy of group type "0" is "state" while the TX policy of group types "4", "5" and "6" is "edge". A "state" TX policy indicates that the transmission opportunity having this TX policy is a prior art TXOP during which transmission of data by the network device associated with that TXOP may occur at any time during the TXOP. In contrast, an "edge" TX policy indicates that the transmission opportunity having this TX policy is a sub-burst slot provided by the present invention, during which transmission of data by the network device associated with the sub-burst slot must occur during the initial few μsecs of the sub-burst slot. The term "collision detection (CD) method" included in the description of group type "0" compared with the term "sub-burst (SB) slot method" included in the description of group types "4", "5" and "6" further conveys that the transmission opportunities associated with a Group_Type of "0" are prior-art TXOPs, while the transmission opportunities associated with group types "4", "5" and "6" are sub-burst slots provided by the present invention.

It will be appreciated that prior-art group type "0" is not irrelevant to table 370, as might be expected, due to the association of this group type with the prior-art, and the association of table 370 with the present invention, i.e. SBSMAPS comprising groups of sub-burst slots. It will therefore be appreciated that prior-art group type "0" is included in table 370 because an SBSMAP provided by the present invention may include prior-art TXOPs alongside inventive TXOPs containing sub-burst slots.

Reference is now made to FIG. 9 which shows an explicit SBSMAP table 470, defining an SBSMAP constructed and operative in accordance with an additional preferred embodiment of the present invention. In exemplary explicit SBSMAP table 470, each row may not correspond to a scheduled sub-burst slot. An additional row, operating as an explicit group separator, may be included in the table after a row pertaining to the final group member of a group, in order to define a duration allotted to that group which may be shorter than the combined duration of all of the sub-burst slots in the group. This shorter duration may only be sufficient for scheduling sub-burst slots for a portion of the members of the group, rather than for all of them. Alternatively, the duration allotted to a group by an explicit group separator may be longer than the combined duration of all of the sub-burst slots in the group.

In the example shown in FIG. 9, a Device_ID value of 63 and a Flow_ID value of 63 identify rows 472, 473, 474 and 475 as explicit group separator rows. Accordingly, as shown in table 470, group j is explicitly allotted a bandwidth duration of D0, rather than the default cumulative duration of all of its group member sub-burst slot durations. Similarly, in TXOP T1, the first scheduling of group k, $k_1$, is explicitly allotted a bandwidth duration of D1, group m is explicitly allotted a bandwidth duration of D2 and the second scheduling of group k, $k_2$, is explicitly allotted a bandwidth duration of D3.

Figure 10:
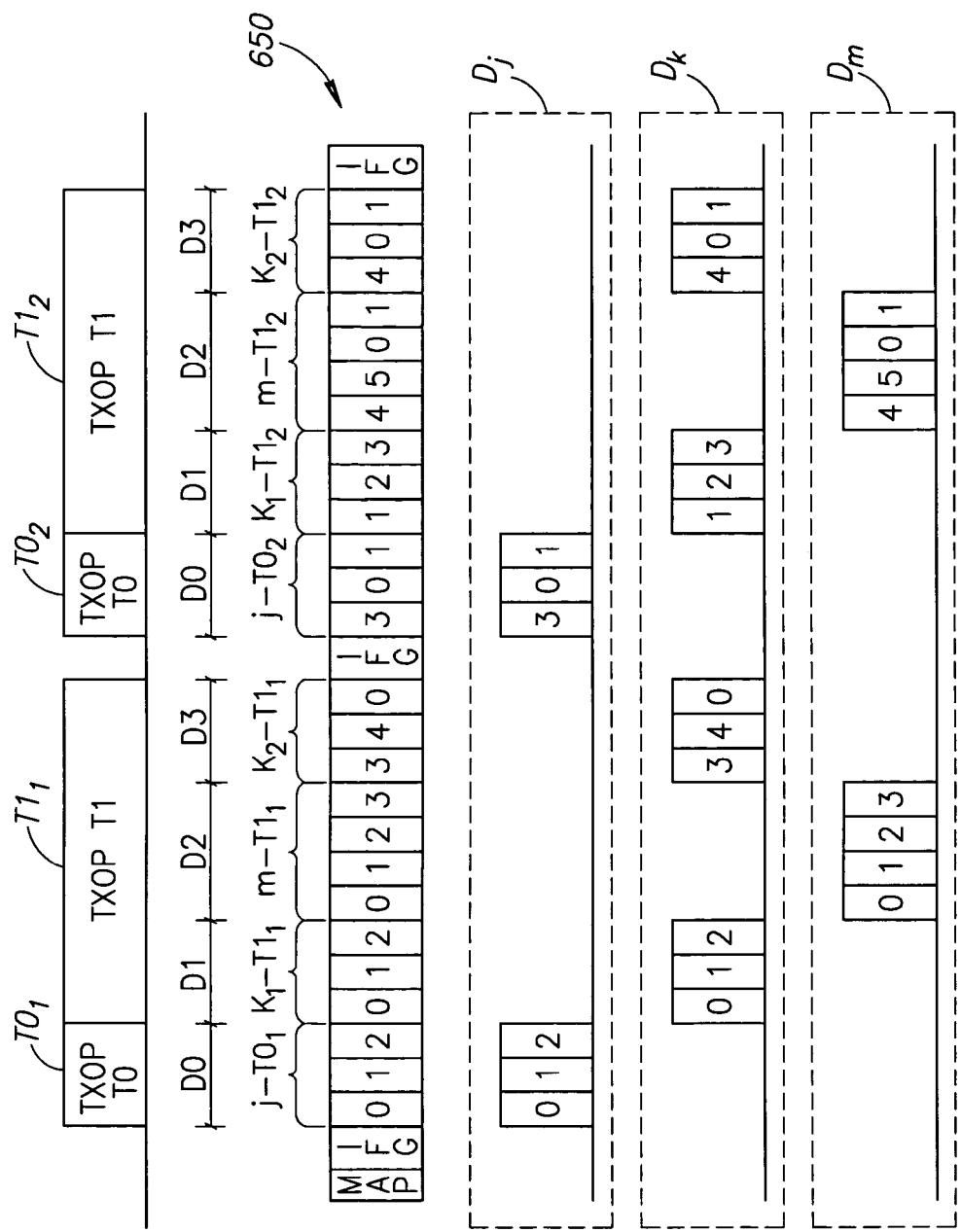
FIG. 10 is a timing diagram illustration of an exemplary transmission cycle for the SBSMAP of FIG. 9.

Reference is now made to FIG. 10 which shows timing diagram illustration 650 for an exemplary transmission cycle for the SBSMAP shown in FIG. 9. Diagrams Dj, Dk and Dm in FIG. 10 clarify sub-burst slot affiliation with groups j, k and m.

Exemplary timing diagram 650 shows two repetitions of each of the two TXOPs T0 and T1 scheduled in SBSMAP 470 in FIG. 9, such that the four TXOPs shown in timing diagram 650 are $T0_1$, $T1_1$, $T0_2$ and $T1_2$.

In the two schedulings of group j shown in timing diagram 650, $j$-$T0_1$ and $j$-$T0_2$, which are scheduled in TXOPs $T0_1$ and $T0_2$ respectively, it may be seen that duration D0 allotted to the scheduling of group j is sufficient to allow the scheduling of three out of the four group members of group j. As shown in timing diagram 650, the first three sub-burst slots in group j, numbered "0", "1" and "2" are scheduled accordingly in the first scheduling of group j, $j$-$T0_1$. In the second scheduling of group j, $j$-$T0_2$, it may be seen that the scheduling sequence begins at the point where the scheduling in $j$-$T0_1$ ended, with the fourth and final group member, associated with the sub-burst slot numbered "3" in group j. Once a full round of the sequence is complete, after the first sub-burst slot scheduled in $j$-$T0_2$, the sequence is restarted, as shown by the scheduling of sub-burst slot "0" in the second sub-burst slot position in $j$-$T0_2$. The orderly, rotational procession through the sequence of group members from first to last, then returning to the first to begin again is illustrated in diagram Dj, where the overall sequence of sub-burst slots scheduled for group j in $j$-$T0_1$ and $j$-$T0_2$ may be seen to be "0,1,2,3,0,1".

With respect to durations D1 and D3 assigned to the first and second schedulings respectively of group k in TXOP T1, and duration D2 assigned to the scheduling of group m in TXOP T1, as shown in table 470 (FIG. 9), it may be seen in the corresponding timing diagram 650 in FIG. 10 that durations D1 and D3 are each sufficient to allow the scheduling of three out of the five group members of group k, and that duration D2 is sufficient to allow the scheduling of four out of the six group members of group m. The orderly rotational scheduling of the group k and m members, like that of the group j members, is shown in diagrams Dk and Dm respectively. It may be seen in diagram Dk that the overall sequence of sub-burst slots scheduled for group k in $k_1$-$T1_1$, $k_2$-$T1_1$, $k_1$-$T1_2$ and $k_2$-$T1_2$ is "0,1,2,3,4,0,1,2,3,4,0,1". In diagram Dm it may be seen that the overall sequence of sub-burst slots scheduled for group m in m-$T1_1$ and m-$T1_2$ is "0,1,2,3,4,5,0,1".

It will be appreciated that sub-burst slots in different groups identified by the same numeral in timing diagram 650, i.e. the sub-burst slots numbered "2" in groups j and m, may not be associated with the same network participant. A numeral identifying a sub-burst slot in timing diagram 650 may correspond to the position of the sub-burst slot in its group sequence, while the network participant with which the sub-burst slot is associated is the network participant associated with the Device_ID and Flow_ID values associated with that sub-burst slot, as listed in corresponding SBSMAP table 470 (FIG. 9). For example, the sub-burst slot numbered "1" in group m is the second sub-burst slot in the group sequence, after the sub-burst slot numbered "0" and before the sub-burst slot numbered "2". In SBSMAP table 470 in FIG. 9, the second sub-burst slot in group m is seen to be the sub-burst slot associated with row 13 in table 470. The network participant associated with the sub-burst slot numbered "1" in group m is therefore the network participant associated with Device_ID "1" and Flow_ID "1" as listed in row 13 of table 470.

Figure 11:
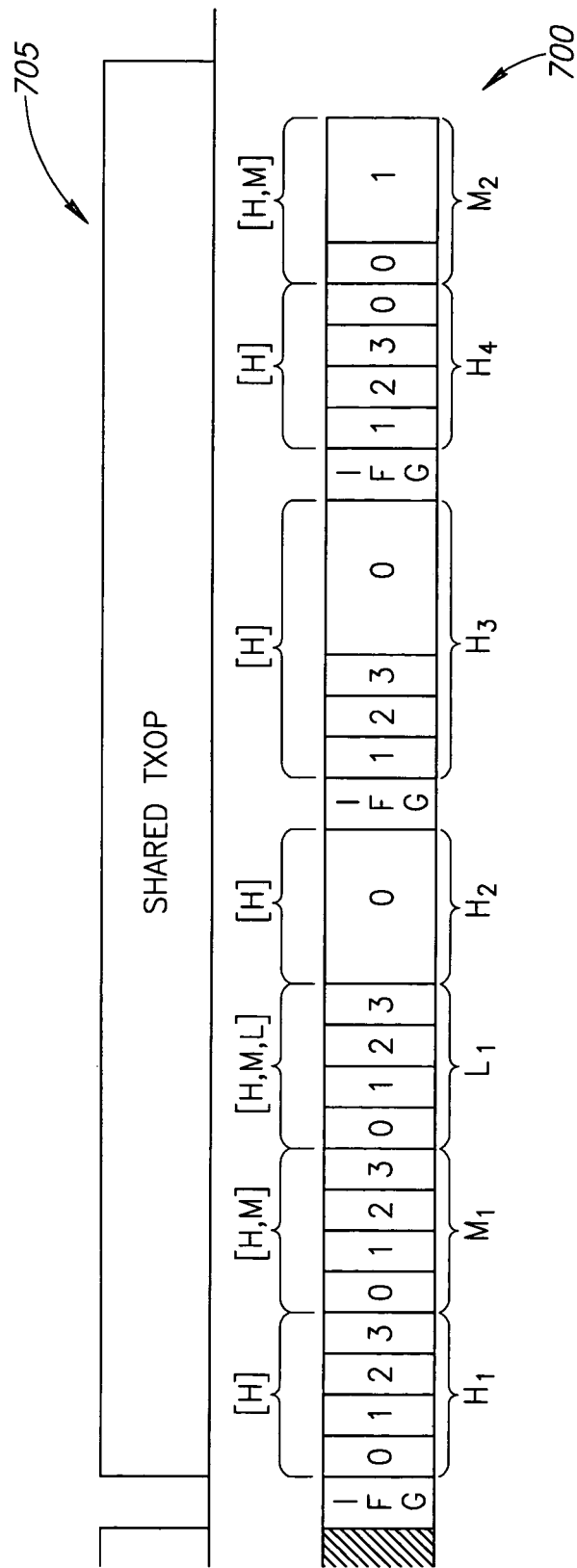
FIG. 11 is a timing diagram illustration for an exemplary transmission cycle for an exemplary alternative SBSMAP featuring data packet priority-based media access opportunity allocation.

Reference is now made to FIG. 11 in which timing diagram 700 is shown for an exemplary transmission cycle for an SBSMAP constructed and operative in accordance with an additional preferred embodiment of the present invention. In this embodiment media access may be allocated to network devices according to the priority of the data packets which will be transmitted by the devices. Accordingly, high priority transmissions may be provided the first media access opportunities, and lower priority transmissions may only subsequently be provided media access opportunities. Any number of priority levels may be used. For example, the eight IEEE 802.1P priority levels may be mapped to fewer than eight media access priorities, e.g. three levels including high (H), medium (M) and low (L). It will also be appreciated that these eight priority levels, or another group of priority levels, may be mapped to a different group of priority levels according to any suitable scheme.

It may be seen in FIG. 11 that successive repetitions of the group comprising the sequence of sub-burst slots "0, 1, 2, 3" are scheduled in shared TXOP 705. In accordance with this embodiment of the present invention, and as shown in FIG. 11, each group scheduled in TXOP 705 is associated with a priority level, allowing the transmission only of data packets having a priority level equal to or exceeding this level during the sub-burst slot opportunities in the group. For example, as shown in FIG. 11, the sub-burst slot opportunities in scheduled groups H1, H2, H3 and H4 are associated with a high priority level H, and may only be used for the transmission of high-priority data packets. The sub-burst slot opportunities in scheduled groups M1 and M2 are associated with a medium priority level M, and may be used for the transmission of data packets of medium or higher priorities. The sub-burst slots opportunities in scheduled group L1 are associated with a low priority level L, and may be used for the transmission of data packets of any priority.

It will be appreciated that in accordance with this embodiment of the present invention, the order of priority-affiliated groups scheduled in the SBSMAP descends from higher priority to lower priority. This is shown in FIG. 11 where the first three groups scheduled in TXOP 705 are the high priority group $H_1$, the medium priority group $M_1$ and the low priority group $L_1$, in that order. It may further be seen that after one of each group has been scheduled, i.e. after the scheduling of group $L_1$, the scheduling sequence returns to the first group in the sequence of groups, i.e. the high priority group H, and thus group $H_2$ is seen to be scheduled in the position of the fourth scheduled group.

The precedential location of higher priority groups in the sequence of groups in the SBSMAP, ensures quantitatively preferential scheduling status to the higher priority groups due to the post-transmission scheduling scheme provided in this embodiment, which, after a transmission, returns the opportunity to transmit to the first group in the sequence of groups. As shown in FIG. 11, after the transmission during sub-burst slot "0" in group $H_2$, high-priority group $H_3$ is scheduled, rather than a medium-priority group. Again after the transmission during sub-burst slot "0" in group $H_3$, high-priority group $H_4$ is scheduled, rather than a medium-priority group. As shown in FIG. 11, the result of precedential location of the high-priority groups in the sequence of groups in the SBSMAP results in repeated scheduling of the higher priority groups at the expense of the lower priority groups.

In an additional preferred embodiment of the present invention, media access may be allocated according to a more efficient priority-based scheme than that provided in the embodiment described with respect to FIG. 11. This embodiment is illustrated with respect to FIG. 12, reference to which is now made, in which timing diagram 750 is shown for an exemplary transmission cycle for an SBSMAP constructed and operative in accordance with an additional preferred embodiment of the present invention.

In this embodiment, scheduler 112 (FIG. 3) may schedule sub-burst slots associated with a particular priority level to network devices which inform scheduler 112 that they have data packets of that priority level to transmit. Network devices which do not inform scheduler 112 of particular priority needs may be assigned low priority sub-burst slots by scheduler 112 by default. Media access opportunities may thus be more precisely reserved for allocation where they are needed, and not wasted where they are not needed.

Figure 12:
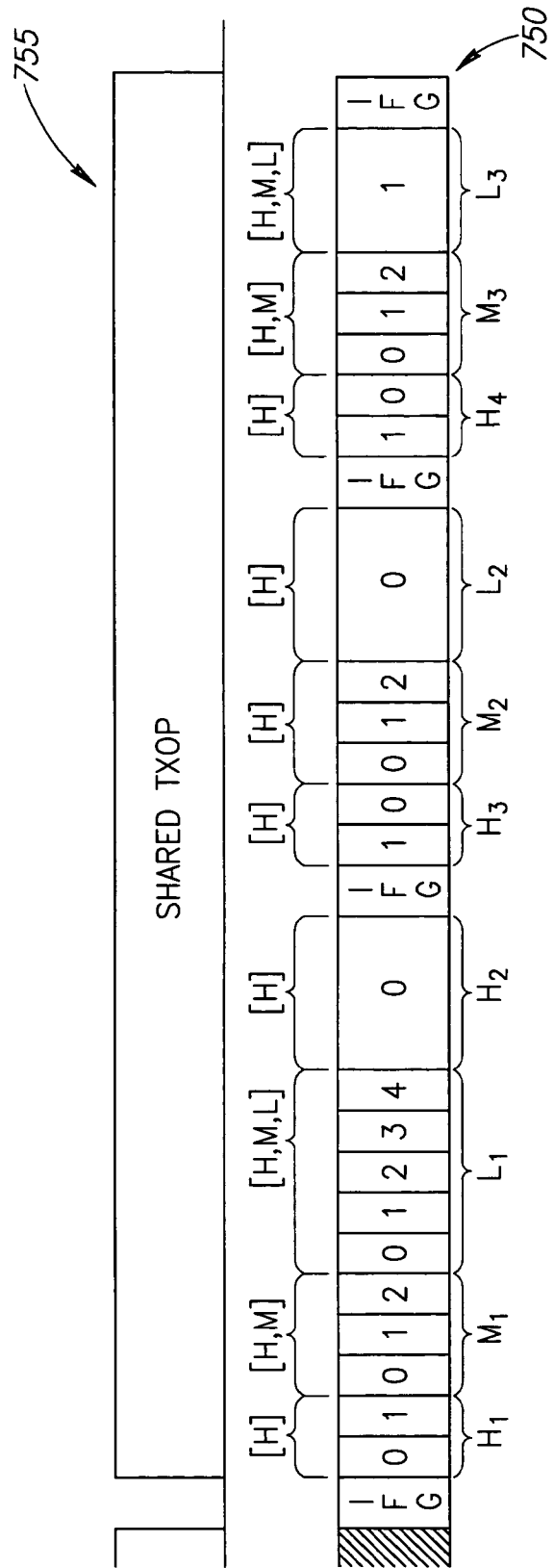
FIG. 12 is a timing diagram illustration for an exemplary transmission cycle for an exemplary alternative SBSMAP featuring need-responsive data packet priority-based media access opportunity allocation.

In order to allocate sub-burst slot transmission opportunities in accordance with data packet priorities to be transmitted by devices, as shown in FIG. 12, scheduler 112 (FIG. 3) may allocate sub-burst slot transmission opportunities for each device in all of the groups associated with a priority level equal to or below the priority level requested by each device. In the example shown in FIG. 12, it may be seen that the network devices associated with sub-burst slots "0" and "1" informed scheduler 112 that they have high priority data packets to transmit. Accordingly, sub-burst slots numbered "0" and "1" are seen to be scheduled in the groups of every priority, i.e. "H", "H,M" and "H,M,L". It may further be seen that the network device associated with sub-burst slot "2" informed scheduler 112 that it has medium priority data packets to transmit. Accordingly, sub-burst slots numbered "2" are seen to be scheduled in the groups having medium and lower priorities, i.e. "H,M" and "H, M, L". Network devices not informing scheduler 112 that they have medium or high priority data packets to transmit, such as those associated with sub-burst slots "3" and "4", as may be seen in FIG. 12, are scheduled in the low priority group "H,M,L" only.

It will be appreciated that in this more efficient priority-based scheme, sub-burst slot opportunities are not wasted on higher priority opportunities for devices that do not have higher priority data packets to transmit. The streamlined result, in which the quantity of members of a group increase with decreasing priority of the group may be seen in FIG. 12, where the highest priority group "H" has two members, the next highest priority group "H,M" has three members, and the lowest priority group "H,M,L" has five members.

It will also be appreciated that in this embodiment of the present invention, high priority groups may enjoy the same quantitatively preferential scheduling as described previously with respect to FIG. 11, owing to the precession of the high priority groups in the sequence of groups in the SBSMAP and the post-transmission scheme of returning to the first group in the sequence of groups after a transmission. As in FIG. 11, the initial order of groups in the SBSMAP in FIG. 12 is shown to descend from the highest priority group to the lowest priority group, as shown in the scheduling of groups $H_1$, $M_1$ and $L_1$, in that order, in TXOP 755 in FIG. 12. Furthermore, as in FIG. 11, the post-transmission return to the scheduling of the first group in the sequence of groups, i.e. the highest priority group, is shown in FIG. 12, where after the transmission during sub-burst slot "0" in group $H_2$, high-priority group $H_3$ is scheduled, rather than a medium-priority group. As in FIG. 11, the result is repeated scheduling of the higher priority groups at the expense of the lower priority groups.

Figure 13:
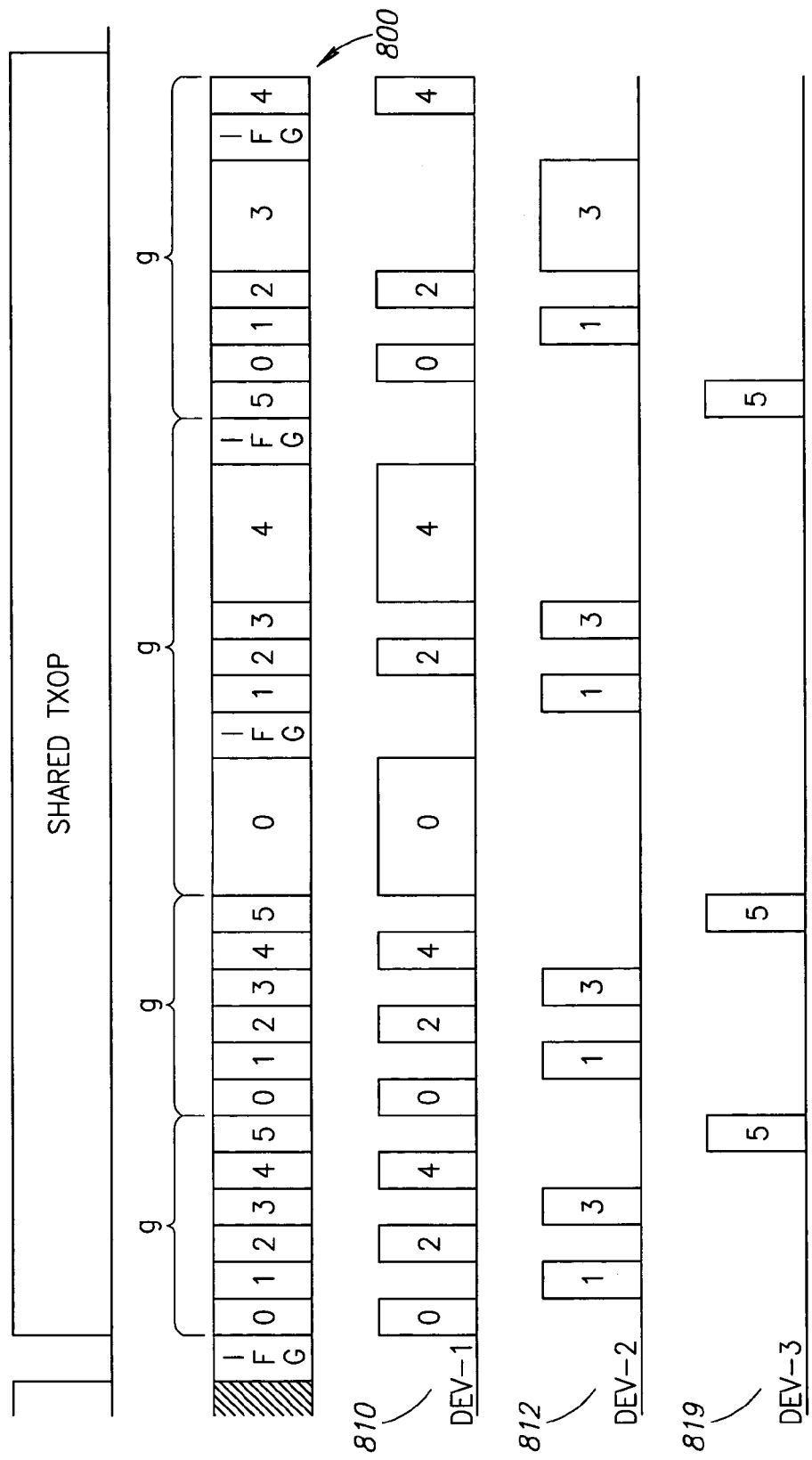
FIG. 13 is a timing diagram illustration for an exemplary transmission cycle for an exemplary alternative SBSMAP featuring bandwidth requirement-based media access opportunity allocation.

An additional preferred embodiment of the present invention is shown in FIG. 13, reference to which is now made. In this embodiment, transmission opportunities may be allotted non-equally to group members, in accordance with the bandwidth requirements of the network participants associated with the members of the group. In this method, sub-burst slot grid scheduler 112 (FIG. 3) may allocate a quantity of sub-burst slot opportunities to each participant which is proportionate to the bandwidth requirements of each participant.

An exemplary non-equal allotment of transmission opportunities to network participants in a group is shown in exemplary timing diagram 800 for an exemplary transmission cycle for an SBSMAP constructed and operative in accordance with this embodiment of the present invention. A series of groups g are shown to be scheduled in timing diagram 800. Each group g comprises the sequence of sub-burst slots "0,1,2,3,4,5". As shown in rows 810, 812 and 819 corresponding to network participants 1 (Dev-1), 2 (Dev-2) and 3 (Dev-3) respectively, it may be seen that for each group g, sub-burst slots "0", "2" and "4" are associated with network participant 1, sub-burst slots "1" and "3" are associated with network participant 2, and sub-burst slot "5" is associated with network participant 3.

As shown in FIG. 13, preference for the allotment of transmission opportunities may be conferred upon particular network participants at the expense other network participants, reflecting varying amounts of bandwidth requested by the network participants according to their needs. In the example of group g, as shown in FIG. 13, the relative proportions of bandwidth requested by network participants 1, 2 and 3 are shown to be 3:2:1 respectively. Network participant 1 is shown to be allotted one half of the transmission opportunities, network device 2 is shown to be allotted two sixths of the transmission opportunities, and network device 3 is shown to be allotted one sixth of the transmission opportunities.

Figure 14:
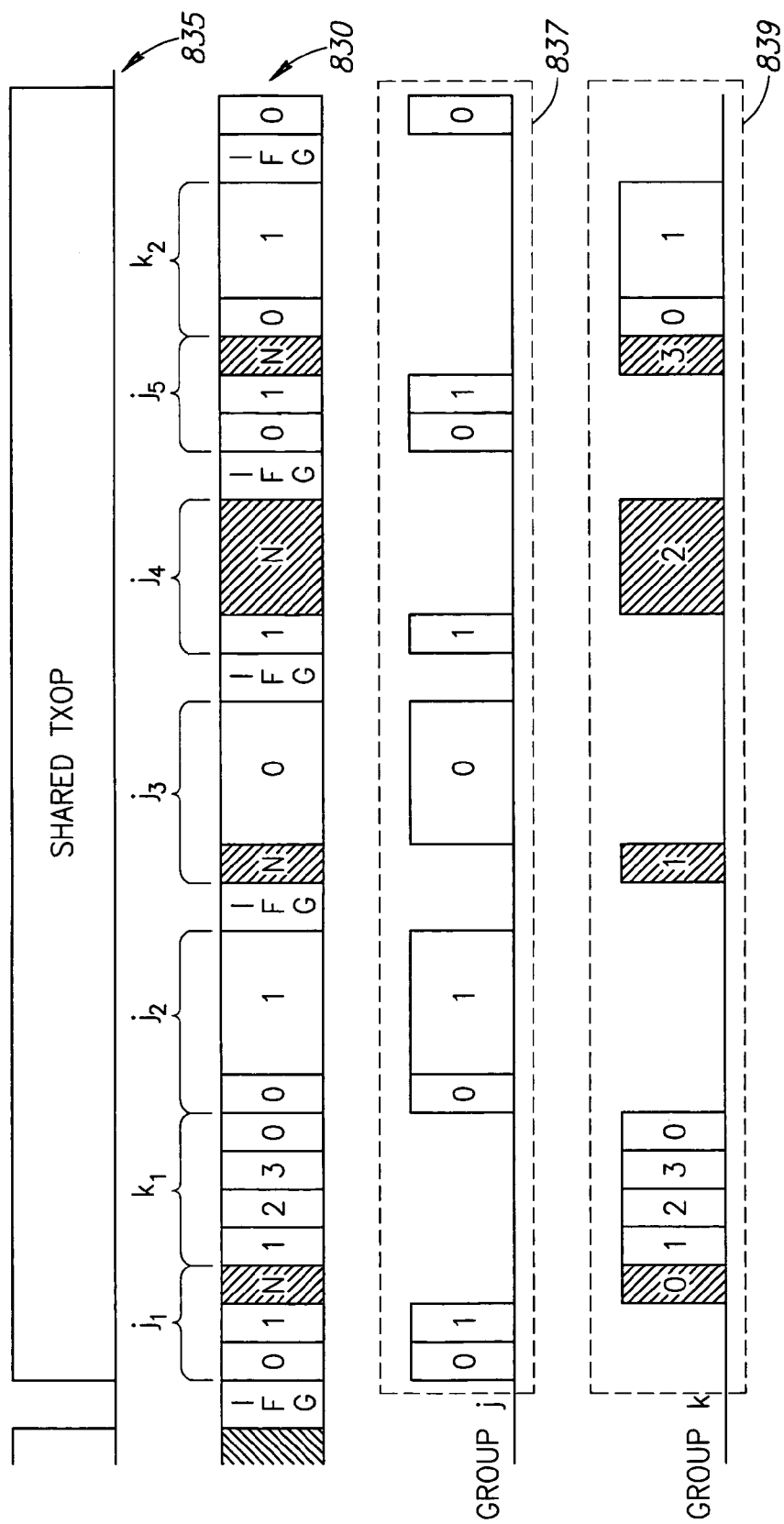
FIG. 14 is a timing diagram illustration for an exemplary transmission cycle for an exemplary alternative SBSMAP featuring media access starvation prevention.

An additional preferred embodiment of the present invention is shown in FIG. 14, reference to which is now made. In accordance with the embodiment of the present invention illustrated in FIG. 14, an SBSMAP constructed and operative in accordance with a preferred embodiment of the present invention may include a mechanism for "starvation prevention". Network participants may starve for lack of transmission opportunity if, for example, they belong to a group having a low priority for the allotment of transmission opportunities, and other groups having a higher priority for the allotment of transmission opportunities are feasting on those opportunities and generally hogging the communal TXOP. The starvation prevention mechanism provided by the present invention and described with respect to FIG. 14 may prevent network participant starvation by occasionally throwing a bone, i.e. a transmission opportunity, to the disadvantaged group. This "wild card" transmission opportunity may be rotated through the disadvantaged group so that the participants in the disadvantaged group may receive transmission opportunities on a round robin basis.

It may be seen in exemplary timing diagram 830 in FIG. 14 that groups j and k are scheduled in TXOP 835 according to an SBSMAP associated with timing diagram 830. It may also be seen that the network participants associated with sub-burst slots "0", "1", "2" and "3" in group k are disadvantaged in comparison with the network participants associated with sub-burst slots "0" and "1" in group j, since group j is scheduled five times in TXOP 835 and group k is scheduled only twice. In timing diagram 830 it may be seen that the reason for this inequality is the precession of group j with respect to group k in the SBSMAP, and, as the first group in the sequence of groups "j, k" in the SBSMAP, scheduling restarts with group j after each transmission. This may be seen in timing diagram 830 where after the transmission in group $j_2$, group $j_3$ is scheduled, and after the transmission in group $j_3$, group $j_4$ is scheduled, and after the transmission in group $j_4$, group $j_5$ is scheduled. Consequently, as may be seen in FIG. 14, the network participants associated with sub-burst slots "0", "1", "2" and "3" in group k are starved for transmission opportunities due to the near monopolization of TXOP 835 by group j.

To provide a measure of correction for this type of inequitable distribution of transmission opportunities, Next_Group opportunities may be scheduled by scheduler 112 (FIG. 3) in an SBSMAP constructed and operative in accordance with a preferred embodiment of the present invention. In the example shown in FIG. 14, a Next_Group opportunity "N" is shown to be scheduled into group j after the group j sequence "0,1". As shown in diagram 839 pertaining to group k, the Next_Group opportunity serves as an additional sub-burst slot which is assigned to the next participant in the queue in group k. This is illustrated in diagram 839 in which the group k sub-burst slot transmission opportunities are seen to be numbered in the repeating consecutive sequence "0,1,2,3,0, 1,2,3,0,1", wherein the first, sixth, seventh and eighth sub-burst slot transmission opportunities are Next_Group opportunities contributed to group k by group j. Group k is thereby less starved of transmission opportunities owing to the transmission opportunities bequeathed to it by group j via the Next_Group opportunities scheme.

Figure 15:
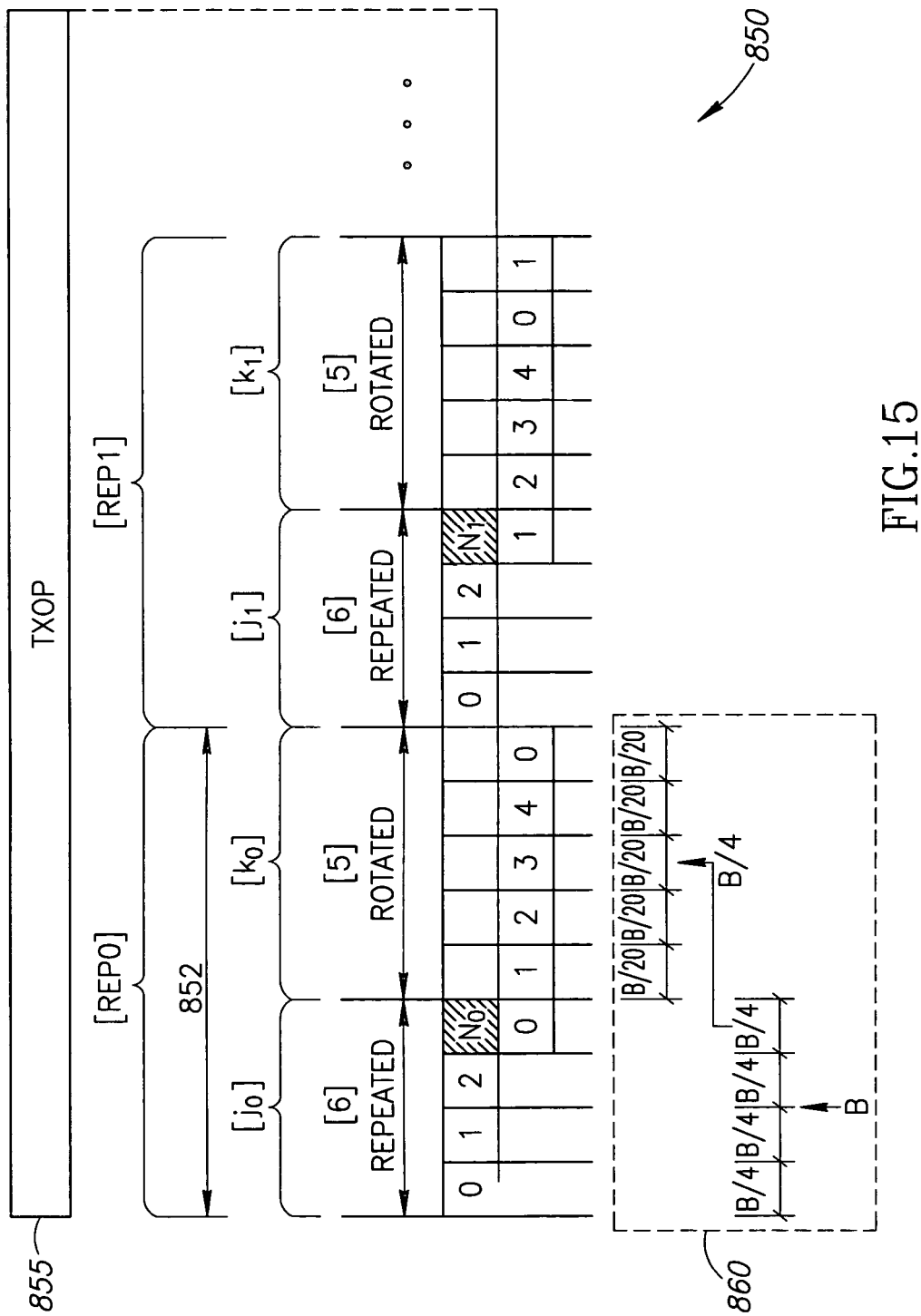
FIG. 15 is a timing diagram illustration for an exemplary transmission cycle for an exemplary alternative SBSMAP featuring bandwidth requirement-based media access opportunity allocation like that provided by the SBSMAP of FIG. 13, and starvation prevention like that provided by the SBSMAP of FIG. 14.

In an additional preferred embodiment of the present invention shown in FIG. 15, reference to which is now made, a more deliberate implementation of the Next_Group opportunity may not provide merely a measure of correction for an inequitable distribution of transmission opportunities, but may calculatingly correct the distribution of transmission opportunities among the network participants so that not only the participants in the first group scheduled in the SBSMAP may be guaranteed the bandwidth they require, but also the participants in the succeeding groups may be guaranteed the bandwidth they require.

As shown in FIG. 15, an amount of bandwidth B may be allotted to the first group scheduled in the SBSMAP. In exemplary timing diagram 850, an amount of bandwidth B is shown to be allotted to group $j_0$, the first scheduled group in the SBSMAP. Because there are four sub-burst slots in group j, bandwidth B may be divided into quarters, with each sub-burst slot allotted one quarter of bandwidth B. Each network flow associated with each of sub-burst slots "0", "1" and "2" in group $j_0$ may thereby be assured a minimum bandwidth of B/4.

It will be appreciated, as shown in FIG. 15, that the fourth sub-burst slot in group j is a Next_Group opportunity. In the example shown in FIG. 15, Next_Group opportunity $N_0$ may bequeath at least one quarter of bandwidth B, but as much as all of the remaining bandwidth not utilized during the duration of the group $j_0$ sub-burst slots, in the event that one or more of the group $j_0$ transmission opportunities are not acted upon, to group $k_0$.

Diagram 860 in FIG. 15 illustrates the worst case scenario in which only one quarter of bandwidth B is guaranteed by Next_Group opportunity $N_0$ to group $k_0$. The five participants in group $k_0$, further to a division of the bandwidth B/4 into five equal parts, are thereby each assured a minimum bandwidth of B/20. Two repetitions Rep0 and Rep1 of initial modular sequence 852 of the SBSMAP, are shown to be scheduled in TXOP 855 in accordance with the group type of group $k_0$, which is "rotated". It may further be seen in FIG. 15 that additional repetitions of initial modular sequence 852 are scheduled for the remaining duration of TXOP 855 in accordance with the TXOP remainder scheduling scheme provided by the present invention for rotated groups.

Figure 16:
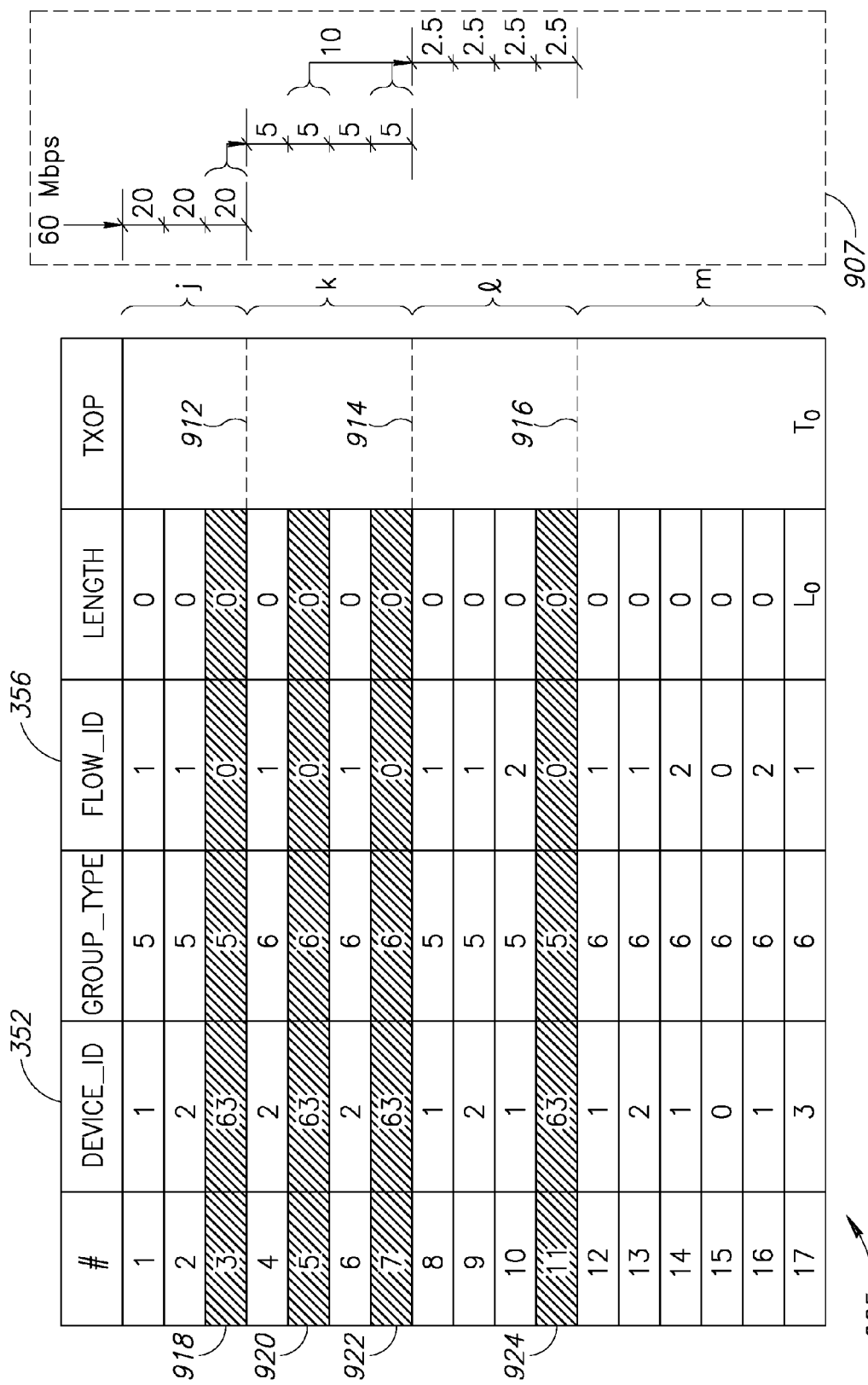
FIG. 16 is an illustration of a tabular representation of an exemplary SBSMAP in accordance with which media access may be provided to network flows in an advanced quality of service scheme.

In an additional preferred embodiment of the present invention, shown in FIG. 16, reference to which is now made, media access may be provided to network flows in an advanced quality of service scheme. In accordance with the advanced quality of service scheme provided by the present invention, the network services may negotiate with scheduler 112 (FIG. 3) for varying levels of guaranteed bandwidth. As shown in FIG. 16, which shows table 905, the tabular representation of the configuration of an SBSMAP constructed and operative in accordance with an additional preferred embodiment of the present invention, a service, like a network participant, may be associated with a unique pair of values provided by the Device_ID and Flow_ID values 352 and 356 respectively. In accordance with this definition, it may be seen in FIG. 18 that sub-burst slots "1", "8" and "12" are associated with a particular service having the Device ID value of 1 and the Flow_ID value of 1. Similarly, it may be seen that sub-burst slots "2", "4", "6", "9" and "13" are associated with a different service having the Device ID value of 2 and the Flow_ID value of 1. Sub-burst slots listed in SBSMAP table 905 as having the same pair of values for the Device_ID and Flow_ID parameters may be similarly associated with a service identified with that pair of values.

The groups into which the 17 sub-burst slots shown in SBSMAP table 905 are grouped in the SBSMAP defined by SBSMAP table 905 are also encoded in the table data. As indicated by dashed line 912, group j comprises the first three sub-burst slots having a Group_Type value of 5, which value may indicate a rotated group. As indicated by dashed line 914, group k comprises the next four sub-burst slots having a Group_Type value of 6, which value may indicate a repeated group. Similarly, dashed line 916 indicates that group l comprises the next four sub-burst slots which have a Group_Type value of 5, and group m closes out the group sequence assigned to TXOP T0 with the next six sub-burst slots which have a Group_Type value of 6.

It will be appreciated, as explained hereinabove with respect to FIG. 6, that in an SBSMAP such as that defined by table 905 in FIG. 16, in which only the group type of the last group in a sequence of groups in an SBSMAP may determine the group scheduling protocol for the remainder of the TXOP to which that sequence of groups is assigned, the group types values assigned to each row in the SBSMAP table may serve as separators to delineate the groups in the sequence, and they may not dictate scheduling protocol in the SBSMAP, except in the final group in the sequence.

Thus, in the example shown in FIG. 16, the alternating group type values of "5" and "6" assigned to the sub-burst slots in groups j, k and l serve to identify the sub-burst slots affiliated with each group, and not group scheduling protocol. I.e., the first three sub-burst slots in the table, which are assigned one group type value, are affiliated with one group, here referred to as group j, the next four sub-burst slots, which are assigned a different group type value, are affiliated with another group, here referred to as group k, etc. In accordance with this embodiment of the present invention, only the group type of the last group, group m, may dictate group scheduling protocol in the shared TXOP.

In systems which support advanced quality of service, each network service may conduct negotiations with the scheduler regarding media access parameters such as bandwidth, latency and jitter. For its part, the scheduler may agree to service requests for guaranteed levels of service in accordance with its abilities to meet the service demands. The ability of the scheduler to meet service requests may be dependent upon the demands on the network at the time of the requests. Network services may request that the scheduler provide them with minimum, average, maximum or best effort levels of guaranteed bandwidth.

Service requests for a minimum level of guaranteed bandwidth may be the bandwidth requirement requests given the highest priority for scheduling by scheduler 112 (FIG. 3), since a minimum level request by a network service may indicate that the service requires at least this level of bandwidth in order to execute its transmissions. I.e., if the service is not provided this minimum bandwidth, it will not be able to execute its transmissions. Service requests for an average level of guaranteed bandwidth may be the bandwidth requirement given the next highest priority for scheduling by the scheduler, followed by service requests for a maximum level of guaranteed bandwidth, followed by service requests for a best effort level of guaranteed bandwidth.

In accordance with the bandwidth allocation hierarchy described hereinabove, the first group in a TXOP scheduled according to the advanced quality of service scheme provided by the present invention may comprise sub-burst slots for the services requesting a minimum level of guaranteed bandwidth, i.e. the highest quality of service. Similarly, the second group in the TXOP may comprise sub-burst slots for the services requesting an average level of guaranteed bandwidth, i.e. the next highest quality of service, the third group in the TXOP may comprise sub-burst slots for the services requesting a maximum level of guaranteed bandwidth, i.e. the third highest quality of service, and the last group in the TXOP may comprise sub-burst slots for the services requesting a best effort level of guaranteed bandwidth, i.e. the lowest quality of service. It may therefore be seen in FIG. 16 that each of the services associated with each of the sub-burst slots in group j requested and received from the scheduler a transmission opportunity guaranteeing a minimum bandwidth level. It may further be seen in FIG. 16, that due to the availability of 60 Mbps to the group of three sub-burst slots in group j, the bandwidth guaranteed to each service in each of the group j sub-burst slots is 20 Mbps.

It may further be seen in FIG. 16 how Next_Group opportunities may be used in the advanced quality of service scheme provided by the present invention to guarantee different levels of bandwidth to network services. In a scheme similar to that described with respect to FIG. 15 for the guaranteed bandwidth scheme provided by the present invention, Next_Group opportunities may be used in the advanced quality of service scheme provided by an alternative embodiment of the present invention to transfer a guaranteed amount of bandwidth from one group, in which each sub-burst slot represents a guaranteed amount of bandwidth, to the next group. Each sub-burst slot in the beneficiary next group will consequently be guaranteed a fraction of the transferred bandwidth. This fraction may equal the amount of transferred bandwidth divided by the number of sub-burst slots in the next group.

For example, as shown in FIG. 16, the division of the available 60 Mbps amongst the three sub-burst slots in group j provides the highest priority guaranteed minimum bandwidth of 20 Mbps to each sub-burst slot in group j, one of which is Next_Group opportunity 918. In the example shown in FIG. 16, Next_Group opportunities may be identified by their assigned Device_ID and Flow_ID values of 63 and 0 respectively. They are indicated in table 905 by diagonal hatching and the reference numerals 918, 920, 922 and 924. In the example shown in FIG. 16, Next$_{13}$Group opportunity 918 transfers at least this 20 Mbps, and at most, all of the bandwidth not utilized in group j, to group k. In the example shown in FIG. 16, it may be seen that each of the network services associated with each of the sub-burst slots in group k, the second group in the SBSMAP, requested and received from scheduler 112 a transmission opportunity guaranteeing an average bandwidth level. In the example shown in FIG. 16, it may be seen that the guaranteed average bandwidth level is 5 Mbps, which equals the 20 Mbps transferred to group k by group j divided among the four sub-burst slots in group k.

It may similarly be seen that the guaranteed maximum bandwidth level in the example shown in FIG. 16, for the third group l in the SBSMAP, is 2.5 Mbps, which equals the 10 Mbps transferred to group l by Next_Group opportunities 920 and 922 in group k divided among the four sub-burst slots in group l.

It will be appreciated that the advanced quality of service scheme provided by the present invention and illustrated with respect to FIG. 16, may provide a method according to which scheduler 112 (FIG. 3) may guarantee different levels of bandwidth to network services in accordance with their requests, subject to the limitations of the network at any given time. Furthermore, through the implementation of Next_Group opportunities as described with respect to FIG. 16, highly efficient use of available bandwidth may be achieved through the forwarding of any and all bandwidth remaining unused in one group to the subsequent group. Thus, little or no bandwidth which a network participant may be prepared to use may be wasted.

The generally efficient usage of bandwidth in the present invention may be further enhanced by the periodic usage of a minimal MAP. A minimal MAP may be introduced into the transmission cycle during a Next Map opportunity sub-burst slot which may be included in an SBSMAP constructed and operative in accordance with an additional preferred embodiment of the present invention.

While a long transmission cycle may provide certain advantages with respect to efficient bandwidth usage, such as minimizing the usage of bandwidth for MAP advertisements over the network, the disadvantage of a long, uninterrupted transmission cycle may be its rigidity. While the network is committed to a particular media access plan, it is unable to react to emergent situations on the network.

For example, time and bandwidth may be wasted while network services negotiate with scheduler 112 (FIG. 3) for guaranteed bandwidth, as described hereinabove with respect to FIG. 16. Next_MAP opportunity sub-burst slots scheduled in an SBSMAP provided by the present invention may constitute windows of opportunity for the scheduler to quickly interrupt the current MAP and transition to the next MAP. This feature may allow usage of time and therefore bandwidth, which would have otherwise been wasted while the original MAP ran its course.

Figure 17A:
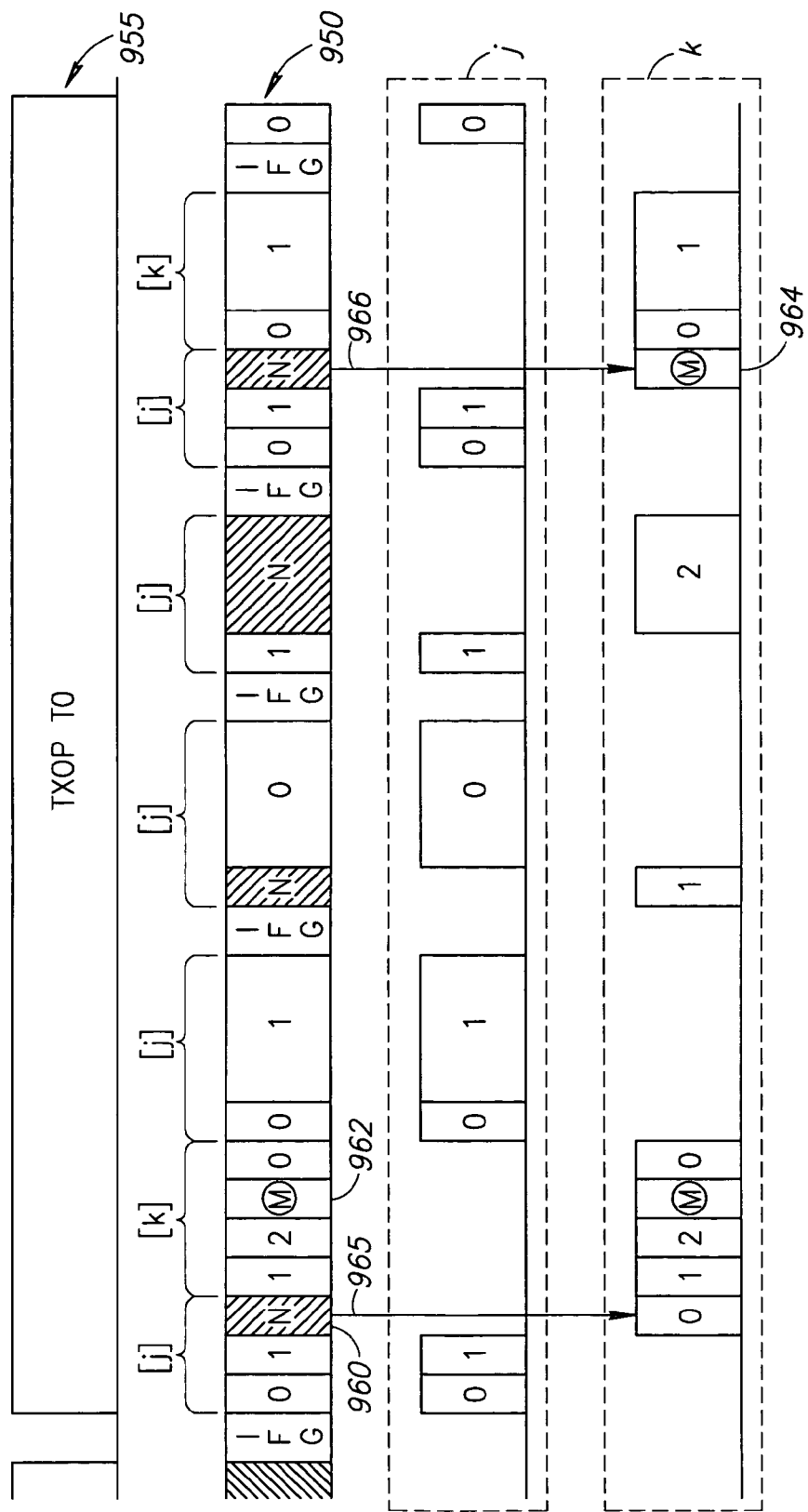
FIGS. 17A and 17B are timing diagram illustrations for an exemplary transmission cycle for an exemplary alternative SBSMAP featuring the implementation of Next Map opportunities.
Figure 17B:
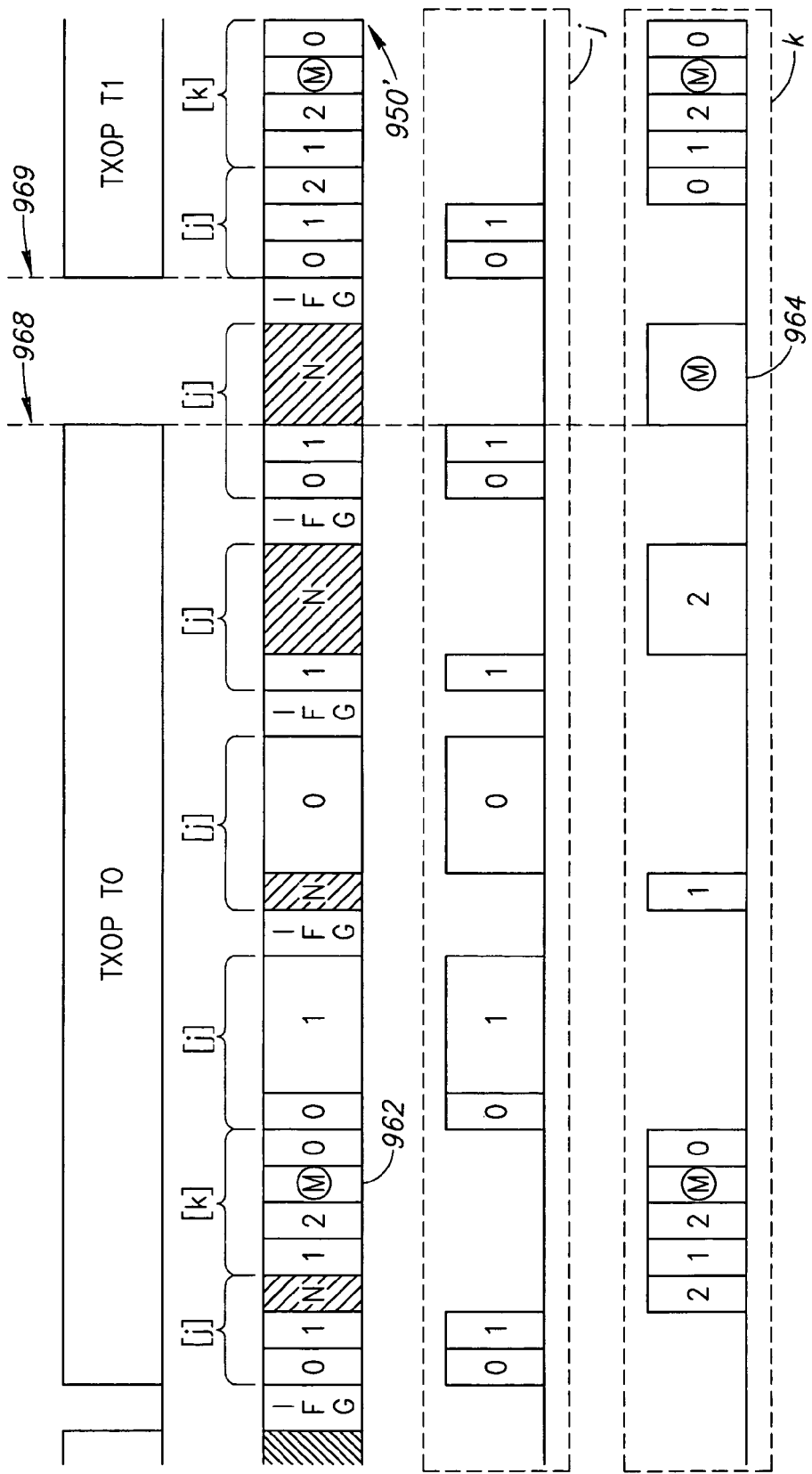

The implementation of a Next_MAP opportunity in accordance with an additional preferred embodiment of the present invention is described with respect to FIGS. 17A and 17B, reference to which is now made. In exemplary timing diagram 950 for an exemplary SBSMAP shown in FIG. 17A, it may be seen that groups j and k, having three and four sub-burst slots each respectively, are scheduled through the duration of TXOP 955. Group j includes a Next_Group opportunity sub-burst slot, indicated by the letter "N" and hatched, and group k includes a Next_MAP opportunity sub-burst slot, indicated by the symbol "M" and circled. It may be seen in FIG. 17A that during Next Group opportunity 960, group j passes the transmission opportunity to the first participant in the queue in the next group, which is the participant associated with sub-burst slot "0" in group k, as indicated by arrow 965. As can be seen in FIG. 17A, no transmission occurs during this sub-burst slot.

During Next_MAP opportunity sub-burst slot 962, scheduler 112 may have the opportunity to interrupt the current TXOP 955, and begin a new TXOP with the first group scheduled in the next MAP. It may be seen in FIG. 17A that scheduler 112 passes on Next_MAP opportunity 962 to interrupt the TXOP and transmit the next MAP. Similarly, during Next_MAP opportunity 964, which occurs as a transmission opportunity is transferred from group j to group k during a Next_Group opportunity as indicated by arrow 966, scheduler 112 again does not act on the opportunity.

Reference is now made to FIG. 17B which shows an additional exemplary timing diagram 950' for an exemplary transmission cycle of the same SBSMAP as that for which timing diagram 950 is shown in FIG. 17A. It may be seen in timing diagram 950' that scheduler 112 again passes on the first Next_MAP opportunity 962 in TXOP T0, but does act upon the second Next_MAP opportunity 964. Consequently, as may be seen in FIG. 17B, TXOP T0 is interrupted at this point, as indicated by reference numeral 968, where scheduler 112 begins the transmission of the next MAP. Accordingly, after the IFG following this transmission, TXOP T1 is initiated, as indicated by reference numeral 969.

Figure 18:
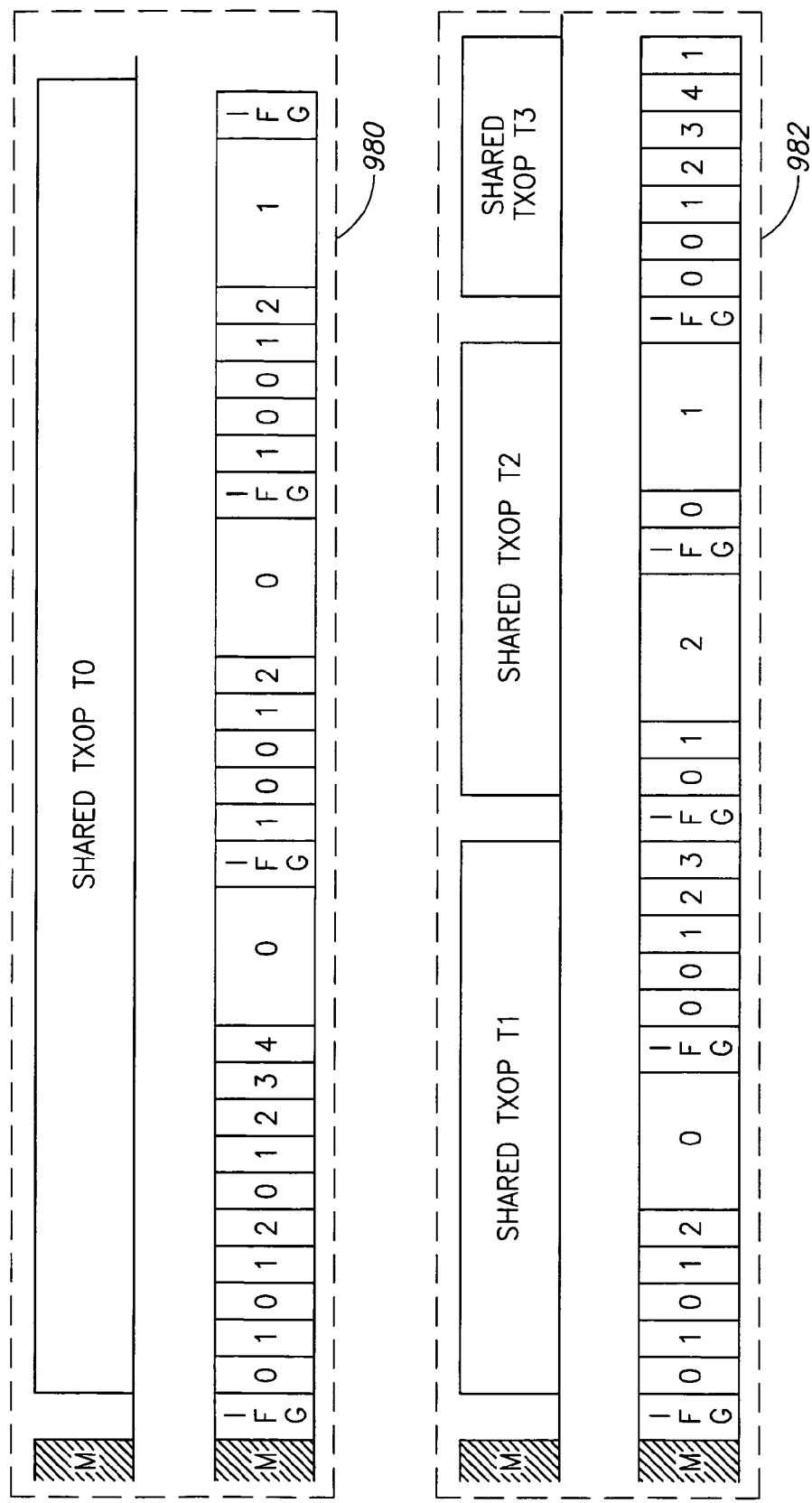
FIG. 18 is a timing diagram illustration for exemplary transmission cycles for exemplary SBSMAPs implemented in a multi-tenant unit (MTU) or a multi-dwelling unit (MDU)

Reference is now made to FIG. 18 which shows an additional preferred embodiment of the present invention implemented within a multi-dwelling unit (MDU) or a multi-tenant unit (MTU). In a prior art MxU, which may be an MDU or an MTU, the master device is able to communicate with all of the endpoints (EPs) in the units owing to carrier sensing operating between the master device and each of the EPs. In an MxU, each unit may have one or more EPs. In the prior art, each device, i.e., the master and each EP, has a separate TXOP in order to guarantee media access. Media access is thereby guaranteed to the master for advertising media access plans over the network, and to the EPs, for data transmissions.

Multiple separate TXOPs in the prior art, required in an MxU for the large number of units if there is only one EP per unit, and for an even larger number of EPs if there is more than one EP per unit, result in an inefficient network having a large overhead and considerable bandwidth wastage.

As shown in FIG. 18, the present invention may provide a generally more efficient method for utilizing available bandwidth in an MxU. As shown in timing diagram 980, which is an exemplary timing diagram for an exemplary transmission cycle for an SBSMAP constructed in accordance with a preferred embodiment of the present invention and operative in an MxU in which there is carrier sensing between the master and all of the EPs, all of the network devices may participate in a single shared TXOP T0.

In an MxU in which there is carrier sensing between the master and all of the EPs, but not between all of the EPs amongst themselves, the EPs between which there is carrier sensing may participate in a shared TXOP in accordance with a preferred embodiment of the present invention. As shown in timing diagram 982, each of shared TXOPs T1, T2 and T3 may serve a group of EPs between which there is carrier sensing.

Figure 19A:
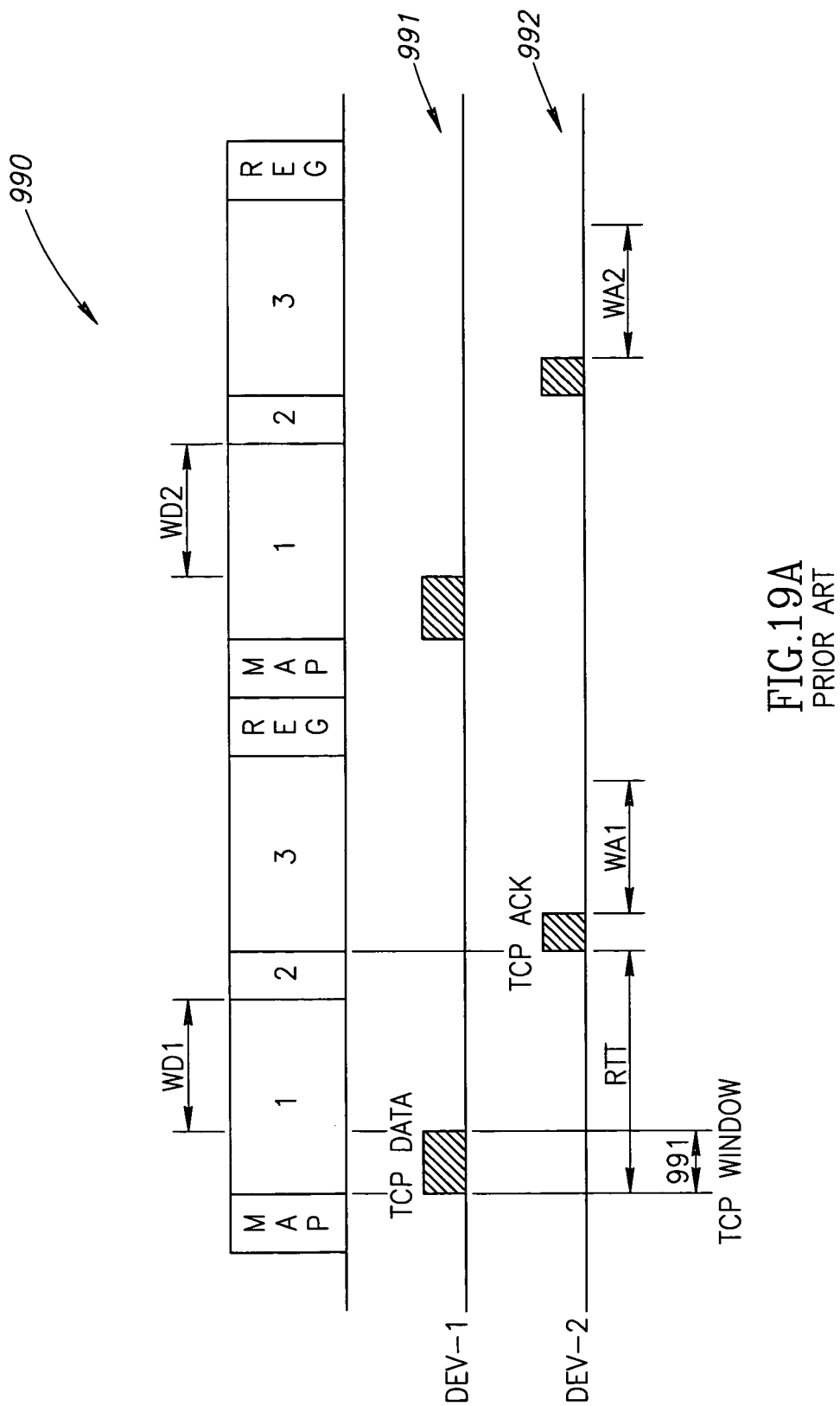
FIG. 19A is a timing diagram illustration for an exemplary transmission cycle for a TCP protocol running on the network shown in FIG. 1.
Figure 19B:
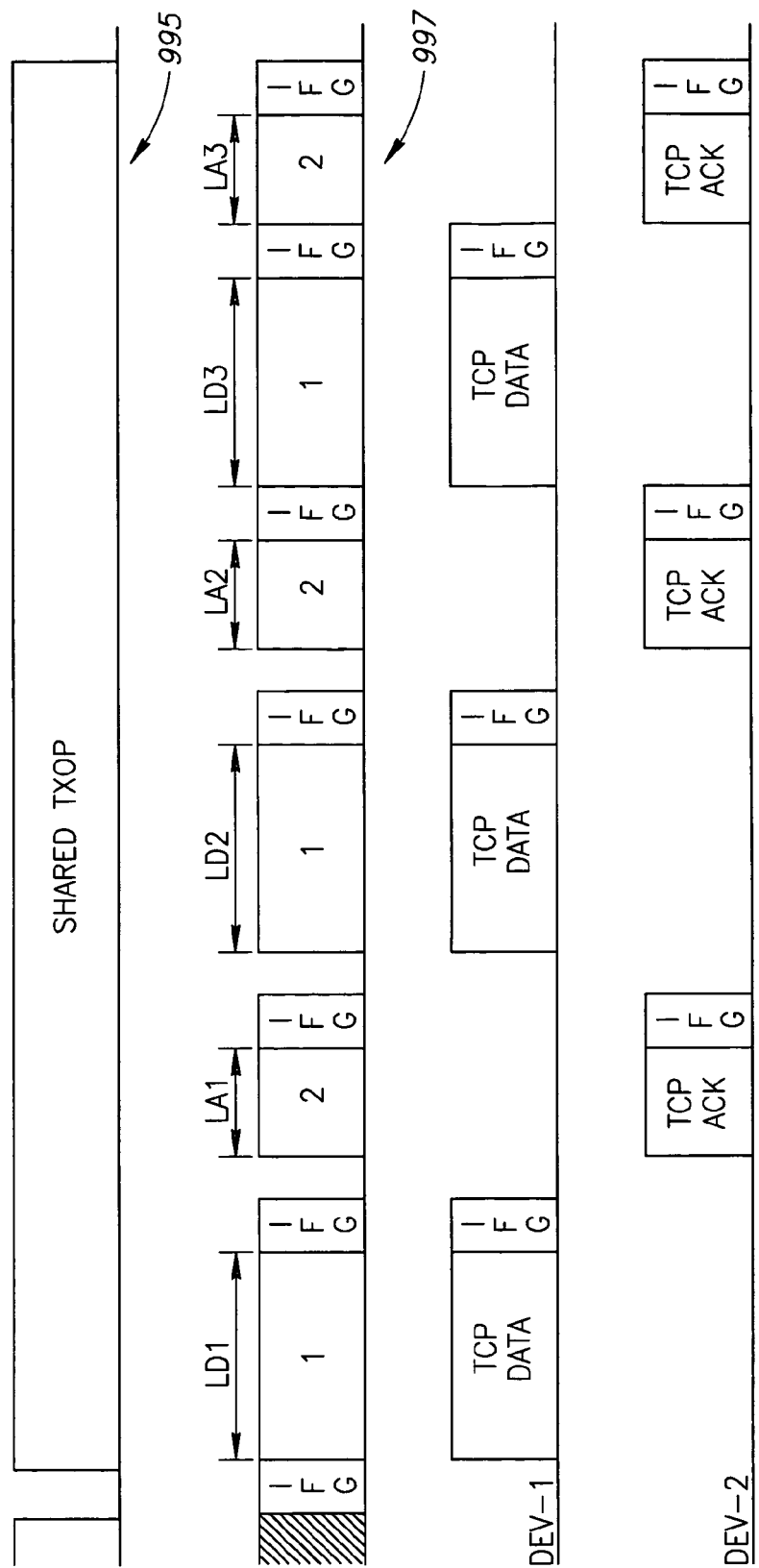
FIG. 19B is a timing diagram illustration for an exemplary transmission cycle for an exemplary SBSMAP implemented for a TCP protocol.

Shared TXOPs having sub-burst slots may also be implemented in a network running a TCP protocol, resulting in more efficient bandwidth usage with respect to the prior art, as shown in FIGS. 19A and 19B, reference to which is now made. The TCP protocol is a bi-directional protocol in which data transmissions (TCP DATA) are followed by transmission acknowledgements (TCP ACK) as shown in timing diagram 990. Each direction has its own dedicated TXOP, as indicated in diagrams 991 and 992 showing TCP data transmissions by network device DEV-1 and TCP acknowledgements by network device DEV-2 respectively. To improve efficiency, there may be a buffer in which multiple data packets are stored until their transmission is acknowledged. The data packets may be stored until acknowledgement is received in case the transmission is not acknowledged and the packets must be sent again. As shown in FIG. 19A, a network running a TCP protocol may suffer from low effective throughput, due to the limitation of the buffer, as represented by TCP window 991. As a result of the limited TCP window 991, bandwidth portions WD1 and WD2 may be wasted, resulting in a long round-trip time (RTT). It may further be seen in FIG. 19A that the minimal TCP ACK traffic underutilizes the bandwidth allocated for the ACK stream resulting in additional wasted bandwidth portions WA1 and WA2. In view of the amount of wasted bandwidth, as shown in FIG. 19A, it may be seen that the available bandwidth is inefficiently utilized.

As shown in FIG. 19B, the implementation of shared TXOPs 995 having sub-burst slots in a network running a TCP protocol in an additional preferred embodiment of the present invention may provide a generally more efficient method for utilizing available bandwidth with respect to the prior art. As shown in FIG. 19B, one device Dev-1 may be associated with sub-burst slots numbered "1" in the SBSMAP, and may use these sub-burst slots for TCP data transmission. For the acknowledgment traffic, a second device, Dev-2 may utilize the sub-burst slots numbered "2" in the SBSMAP. As may be seen in FIG. 19B, through the implementation of sub-burst slot transmission opportunities, the TCP data transmissions may occupy the transmission medium for the exact amounts of time required, as indicated I timing diagram 997 by transmission durations LD1, LD2 and LD3, with no wastage of bandwidth. Similarly, as indicated by acknowledgement durations LA1, LA2 and LA3, the TCP acknowledgement transmissions may occupy the transmission medium for the exact amounts of time required, with no wastage of bandwidth. It may thus be seen that in accordance with the present invention TCP data and acknowledge transmissions may occupy TXOP opportunities in a shared TXOP as needed in a very efficient manner. The total RTT may also be minimal, and may be the real RTT of the devices and not the shared media.

It will be appreciated that SBSMAPs constructed and operative in accordance with a preferred embodiment of the present invention may include any number of TXOPs, any number of which may contain sub-burst slots. The sub-burst slots may be grouped, according to a variety of parameters such as data flow priority, device priority or quality of service (QoS) requirements. The sub-burst slots within a group may be sequenced according to any algorithm, and the groups within a TXOP may be sequenced according to any algorithm.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A network device forming part of a data network, said device comprising:
    a receiver to receive a MAP (Media Access Plan) which comprises a schedule with a plurality of initiation slots each allocated to one of a plurality of network devices, wherein each said initiation slot has a length of less than a minimum burst duration of any data transmission in said data network;
    a transmitter to initiate a data transmission during one of said plurality of initiation slots associated with said network device and to continue said data transmission beyond an end of the one of said plurality of initiation slots until said data transmission is complete; and a grid aligner to stop said schedule at a current initiation slot when a data transmission begins from the network device allocated to said current initiation slot and to recalculate the timing of said schedule due to the duration of said data transmission at the next initiation slot following the current initiation slot according to an original temporal order of initiation slots in said schedule to allow for a transmission from the network device allocated to said next initiation slot.

2. The method according to claim 1 and comprising scheduling said plurality of initiation slots within at least one shared transmission opportunity (TXOP).

3. The method according to claim 2 and wherein said schedule starts at a beginning of said at least one shared TXOP.

4. The method according to claim 1 and wherein said minimum burst duration is sufficient to transmit at least a single data frame.

5. The method according to claim 4 and wherein a length for said minimum burst duration is variable.

6. The method according to claim 1 and and wherein said plurality of initiation slots are organized into modular groups.

7. The method according to claim 6 and wherein each of said modular groups is associated with one of a plurality of group types.

8. The method according to claim 6 and wherein an initial modular group sequence comprises at least one of a single modular group and a sequence of said modular groups.

9. The method according to claim 8 and wherein a group type of a last scheduled group in initial modular group sequence determines a subsequent sequence of scheduled groups following said initial modular group sequence.

10. The method according to claim 1 and wherein different quantities of said plurality of initiation slots are allotted to said network participants.

11. The method according to claim 10 and wherein said different quantities are proportionate to bandwidth requests of said network participants.

12. The method according to claim 6 and wherein an explicit group separator is scheduled in at least one of said modular groups having a particular number of initiation slots to define a quantity of said initiation slots to be scheduled for said at least one said modular group wherein said quantity is different than said number.

13. The method according to claim 6 and in at least one of said modular groups, at least one next group opportunity initiation slot is scheduled for a succeeding modular group.

14. The method according to claim 6 and an amount of bandwidth is divided equally among initiation slots of a modular group.

15. The method according to claim 13 and an amount of bandwidth is divided equally among said plurality of initiation slots of a said modular group wherein at least one of said initiation slots is one of said at least one next group opportunity initiation slots.

16. The method according to claim 6 and wherein in at least one of said groups, a next map opportunity initiation slot is scheduled for interrupting said schedule.

17. The method according to claim 1 and wherein said network device is a HPNA network device.

18. The method according to claim 1 and wherein said data transmission is initiated at a beginning of said initiation slot.

19. The method according to claim 18 and wherein said beginning is within the first 2-4 μsecs of said time slot.

20. The method according to claim 7 and wherein each of said group types is at least one of the following types: fixed, rotated, and repeated.

21. The method according to claim 7 and wherein each one of said group types is associated with a post-transmission scheduling protocol dictating which initiation slot is scheduled after a transmission.

22. The method according to claim 7 and wherein each one of said group types is associated with a group scheduling protocol dictating a scheduled sequence of groups.

23. The method according to claim 22 and wherein a duration of time allotted to said scheduled sequence of groups is longer than a sum of durations of initiation slots in said modular groups.

24. The method according to claim 22 and comprising indicating parameters for an entry of said MAP, wherein the parameters include:
    a device identification number identifying a network participants;
    a group type number associated with one of said plurality of group types;
    a data flow identification number associated with a data flow;
    a TXOP_number assigned to sequential transmission opportunity (TXOP); and
    a TXOP length dictating a length of a TXOP.

25. The method according to claim 7 and wherein at least one of said plurality of initiation slots is a registration time slot.

26. The method according to claim 6 and wherein each of said modular groups is associated with a priority level.

27. The method according to claim 6 and wherein for at least one of said modular groups having a particular number of initiation slots, a different number of said initiation slots is scheduled for at least one group.

28. A method for a data network, the method comprising:
    receiving a MAP (Media Access Plan) which comprises a schedule with a plurality of initiation slots each associated with one of a plurality of network devices, wherein each said initiation slot has a length of less than a minimum burst duration of a data transmission in said data network; and
    following said MAP, wherein said following comprises:
        listening for data transmissions associated with said plurality of initiation slots;
        detecting a data transmission from the network device allocated to a current initiation slot, said data transmission extending beyond an end of said current initiation slot;
        stopping said schedule at said current initiation slot when said data transmission is detected; and
        recalculating the timing of said schedule due to the duration of said data transmission at the next initiation slot following the current initiation slot according to an original temporal order of initiation slots in said schedule to allow for a transmission from the network device allocated to said next initiation slot.

* * * * *